(12) United States Patent
Manabe et al.

(10) Patent No.: US 7,189,440 B2
(45) Date of Patent: *Mar. 13, 2007

(54) LIQUID-CRYSTALLINE MEDIUM

(75) Inventors: Atsutaka Manabe, Bensheim (DE); Peer Kirsch, Seeheim-Jugenheim (DE); Eike Poetsch, Mühltal (DE); Georg Luessem, Petershausen (DE); Michael Heckmeier, Hemsbach (DE); Melanie Klasen-Memmer, Heuchelheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/014,205

(22) Filed: Dec. 17, 2004

(65) Prior Publication Data
US 2005/0179007 A1    Aug. 18, 2005

(30) Foreign Application Priority Data
Dec. 17, 2003    (DE) ................................ 103 59 472

(51) Int. Cl.
C09K 19/34    (2006.01)
C09K 19/30    (2006.01)
C09K 19/12    (2006.01)
C09K 19/20    (2006.01)

(52) U.S. Cl. ............. 428/1.3; 252/299.61; 252/299.63; 252/299.66; 252/299.67

(58) Field of Classification Search ................ 428/1.1; 252/299.01, 299.61, 299.63, 299.66, 299.67
See application file for complete search history.

(56) References Cited
U.S. PATENT DOCUMENTS

| 6,902,777 B2 * | 6/2005 | Hirschmann et al. ......... 428/1.1 |
| 2005/0040365 A1 * | 2/2005 | Heckmeier et al. .... 252/299.63 |
| 2005/0205842 A1 * | 9/2005 | Heckmeier et al. .... 252/299.61 |

* cited by examiner

Primary Examiner—Shean C. Wu

(57) ABSTRACT

The invention relates to a liquid-crystalline medium comprising at least one pyran compound of the formula I

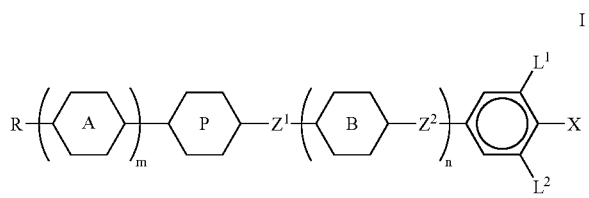

and one or more compounds selected from the group consisting of the compounds C-1 to C-5

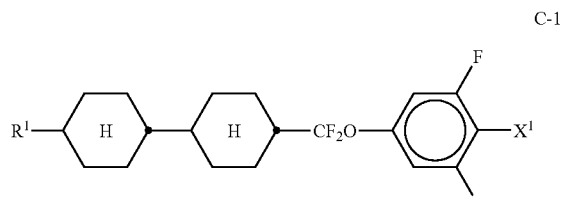

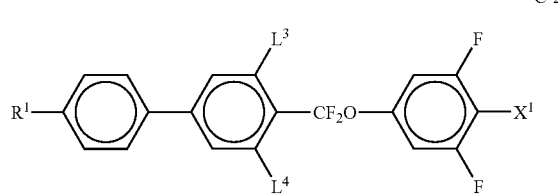

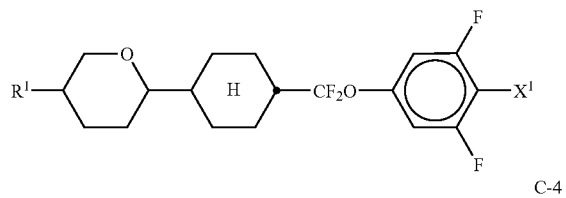

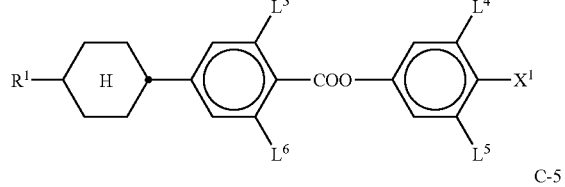

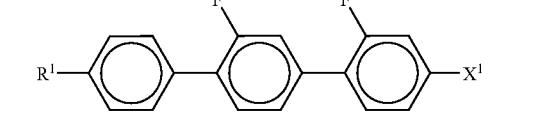

in which the R, $R^1$, the rings A, B and P, $L^{1-6}$, X, $X^1$, $Z^1$, $Z^2$, m and n are as defined above and to electro-optical displays containing a liquid-crystalline medium of this type.

16 Claims, No Drawings

LIQUID-CRYSTALLINE MEDIUM

The present invention relates to a liquid-crystalline medium, to the use thereof for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapor pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The TFT displays usually operate as TN cells with crossed polarisers in transmission and are back-lit.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

In addition to liquid-crystal displays which use back-lighting, i.e. are operated transmissively and if desired transflectively, reflective liquid-crystal displays are also particularly interesting. These reflective liquid-crystal displays use the ambient light for information display. They thus consume significantly less energy than back-lit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation (d·$\Delta n$). This low optical retardation results in usually acceptable low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

A further highly promising electro-optical mode is the so-called "optically compensated bent" (OCB) mode, as described, for example, in Yamaguchi et al., "Wide-Viewing Angle Display Mode for Active-Matrix LCD using Bend-Alignment Liquid-Crystal Cell", SID 93 Digest, p. 277 (1993).

Since this mode has a favorable viewing-angle dependence of the contrast, it is particularly suitable for directview displays. In addition, it is distinguished by short response times. In an OCB display, the LC director already has a homeotropic perpendicular alignment on a substrate in the unaddressed state. The degree of director realignment on application of a voltage in an OCB display is consequently much less than, for example, in a conventional TN display. Liquid crystals for OCB displays thus require higher values for the birefringence than those for TN displays. Δn is typically greater than 0.13, preferably greater than 0.15.

There thus continues to be a great demand for MLC displays having very high specific resistance at the same time as a large working-temperature range, short response times even at low temperatures and low threshold voltage which do not have these disadvantages or only do so to a lesser extent.

In TN (Schadt-Helfrich) cells, media are desired which facilitate the following advantages in the cells:
- extended nematic phase range (in particular down to low temperatures)
- the ability to switch at extremely low temperatures (outdoor use, automobiles, avionics)
- increased resistance to UV radiation (longer life)
- large optical birefringence for OCB applications
- low threshold voltage The media available from the prior art do not allow these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention has an object of providing media, in particular for MLC, TN or OCB displays of this type, which do not have the above-mentioned disadvantages or only do so to a lesser extent, and preferably at the same time have very high specific resistance values and low threshold voltages. This object is preferably met using liquid-crystalline compounds which have a high clearing point and low rotational viscosity.

Upon further study of the specification and appended claims, further objects and advantages of this invention will become apparent to those skilled in the art.

It has now been found that these and other objects can be achieved if use is made of the liquid-crystalline compounds of the formulae I and C-1 to C-5. The compounds of the formula I reduce the elastic constants, in particular $K_1$, and, in combination with the compounds of the formulae C-1 to C-5, result in mixtures having particularly low threshold voltages.

The invention thus relates to a liquid-crystalline medium based on a mixture of polar compounds of positive dielectric anisotropy comprising one or more pyran compounds of the formula I

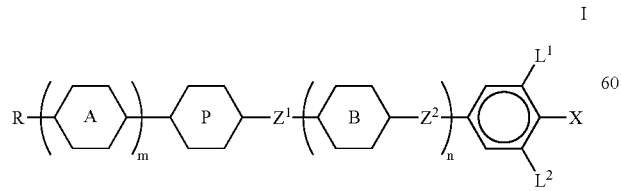

and one or more compounds selected from the group consisting of the compounds C-1 to C-5

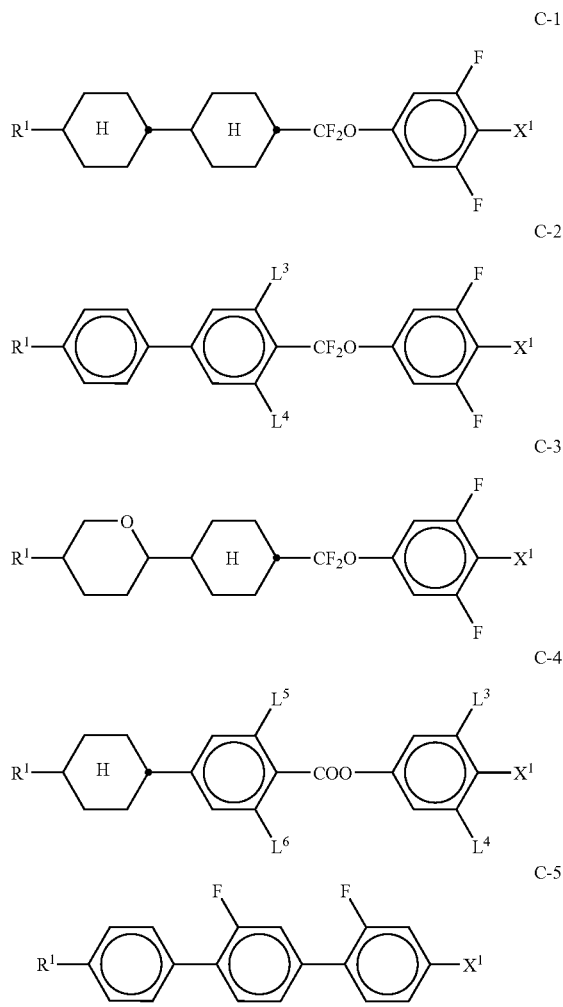

in which

R and $R^1$ are each, independently of one another, H, a halogenated or unsubstituted alkyl or alkoxy radical having from 1 to 15 carbon atoms, where, in addition, one or more $CH_2$ groups in these radicals may each, independently of one another, be replaced by —C≡C—, —CH=CH—, —O—, —CO—O— or —O—CO— in such a way that O atoms are not linked directly to one another,

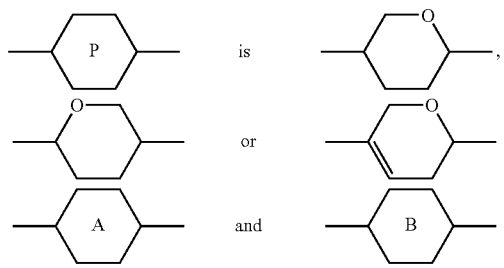

are each, independently of one another,

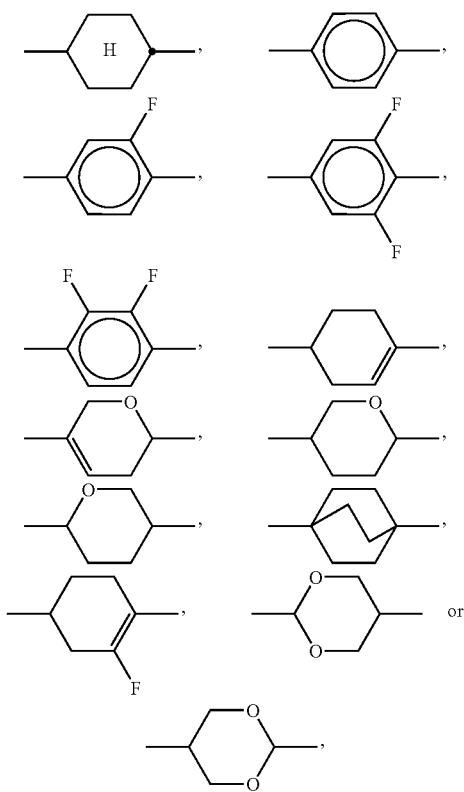

X and $X^1$ are each, independently of one another, F, Cl, CN, $SF_5$, NCS, a halogenated alkyl radical having up to 8 carbon atoms, where one or more $CH_2$ groups may be replaced by —O— or —CH=CH— in such a way that O atoms are not linked directly to one another, $Z^1$ and $Z^2$ are each, independently of one another, —COO—, —OCO—, —$CH_2O$—, —$OCH_2$—, —$CF_2CF_2$—, —CF=CF—, —C≡C—, —CH=CF—, —CF=CH—, —$CH_2CH_2$—, —$(CH_2)_4$—, —CH=CH— or a single bond, $L^{1-6}$ are each, independently of one another, H or F, and m and n are each, independently of one another, 0, 1, 2 or 3, where m+n≤3.

In the pure state, the compounds of the formulae I and C-1 to C-5 are colorless and generally form liquid-crystalline mesophases in a temperature range which is favorably located for electro-optical use. In particular, the mixtures according to the invention are distinguished by their high dielectric anisotropies and their low values for the rotational viscosity. They are stable chemically, thermally and to light. The medium according to the invention is particularly suitable for TN, TFT, IPS and OCB applications.

Preferred radicals of the compounds of the formulae I and C-1 to C-5 are mentioned below.

OX and/or $X^1$ in the compounds of the formula I are preferably F, Cl, CN, NCS, $CF_3$, $C_2F_5$, $C_3F_7$, $SF_5$, $CF_2H$, $OCF_3$, $OCF_2H$, $OCFHCF_3$, $OCFHCH_2F$, $OCFHCHF_2$, $OCF_2CH_3$, $OCF_2CH_2F$, $OCF_2CHF_2$, $OCF_2CF_2CHF_2$, $OCF_2CF_2CH_2F$, $OCFHCF_2CF_3$, $OCFHCF_2CHF_2$, $OCHFCHFCF_3$, $OCH_2CF_2CF_3$, $OCF_2CF_2CF_3$, $OCF_2CHFCHF_2$, $OCF_2CH_2CHF_2$, $OCHFCF_2CH_2F$, $OCHFCHFCHF_2$, $OCHFCH_2CF_3$, $OCH_2CHFCF_3$, $OCH_2CF_2CHF_2$, $OCH_2CHFCH_3$, $OCH_2CH_2CHF_2$, $OCHFCF_2CH_3$, $OCHFCHFCFH_2$, $OCHFCH_2CF_3$, $OCH_2CF_2CHF_2$, $OCH_2CHFCHF_2$, $OCF_2CH_2CH_3$, $OCHFCHFCH_3$, $OCHFCH_2CHF_2$, $OCH_2CF_2CH_3$, $OCH_2CHFCHF_2$, $OCH_2CH_2CHF_2$, $OCHCH_2CH_3$, $OCH_2CHFCH_3$, $OCH_2CH_2CHF_2$, $OCClFCF_3$, $OCClFC-ClF_2$, $OCClFCHF_2$, $OCFHCCl_2F$, $OCClFCF_2H$, $OCClFC-ClF_2$, $OCF_2CClH_2$, $OCF_2CCl_2H$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CF_2H$, $OCClFCF_2CClF_2$, $OCClFCFHCF_3$, $OCClFCClFCF_3$, $OCCl_2CF_2CF_3$, $OCClHCF_2CF_3$, $OCClFCF_2CF_3$, $OCClFC-ClFCF_3$, $OCF_2CClFCFH_2$, $OCF_2CF_2CCl_2F$, $OCF_2CCl_2CF_2H$, $OCF_2CH_2CClF_2$, $OCClFCF_2CFH_2$, $OCFHCF_2CCl_2F$, $OCClFCFHCF_2H$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCClFCFH_2$, $OCFHCFHCCl_2F$, $OCClFCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClFCFHCH_3$, $OCF_2CClFCCl_2H$, $OCClFCH_2CFH_2$, $OCFHCCl_2CFH_2$, $OCCl_2CF_2CH_3$, $OCH_2CF_2CClH_2$, $OCCl_2CFHCFH_2$, $OCH_2CClFCFCl_2$, $OCH_2CH_2CF_2H$, $OCClHCClHCF_2H$, $OCH_2CCl_2CF_2H$, $OCClFCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, CH=$CF_2$, CF=$CF_2$, OCH=$CF_2$, OCF=$CF_2$, CH=CHF, OCH=CHF, CF=CHF, OCF=CHF, in particular F, Cl, CN, NCS, $CF_3$, $SF_5$, $CF_2H$, $OCF_3$, $OCF_2H$, $OCHFCF_3$, $OCHFCH_2F$, $OCHFCHF_2$, $OCF_2CH_3$, $OCF_2CH_2F$, $OCF_2CHF_2$, $OCF_2CF_2CHF_2$, $OCF_2CF_2CH_2F$, $OCHFCF_2CF_3$, $OCHFCF_2CHF_2$, $OCF_2CF_2CF_3$ or $OCF_2CFHCF_3$.

The ring P is preferably

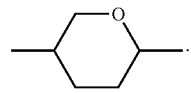

The rings A and B are preferably

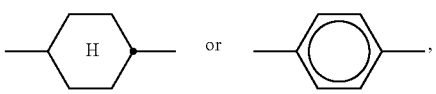

furthermore

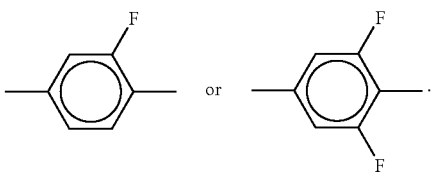

If the rings A and B are present more than once, the rings can have, independently of one another, identical or different meanings.

$Z^1$ and $Z^2$ are preferably a single bond.

X is particularly preferably F or $OCF_3$, and $X^1$ is preferably F, Cl or $OCF_3$.

Preferred smaller groups of compounds of the formula I are those of the sub-formulae I1 to I14:

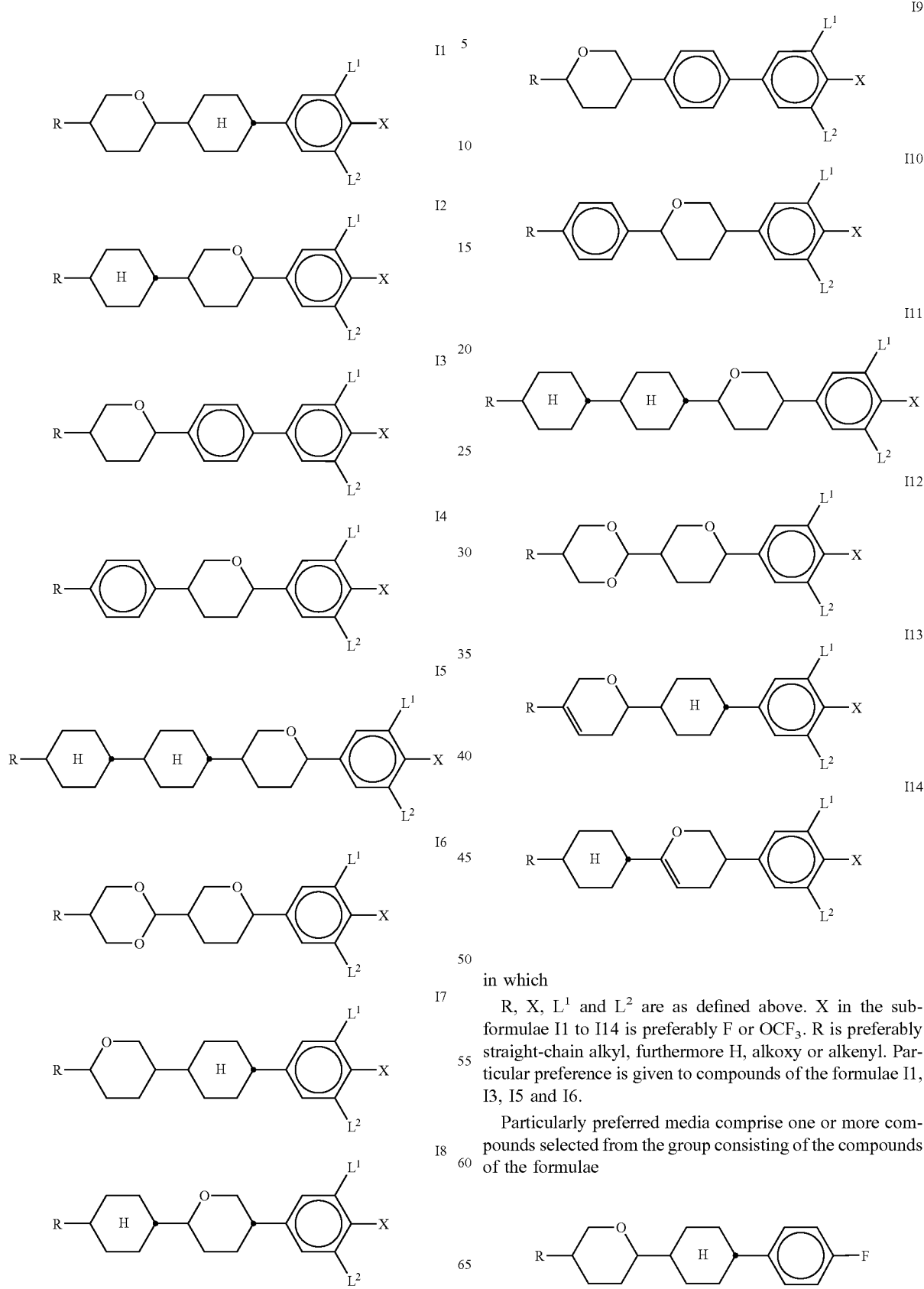

in which

R, X, $L^1$ and $L^2$ are as defined above. X in the sub-formulae I1 to I14 is preferably F or $OCF_3$. R is preferably straight-chain alkyl, furthermore H, alkoxy or alkenyl. Particular preference is given to compounds of the formulae I1, I3, I5 and I6.

Particularly preferred media comprise one or more compounds selected from the group consisting of the compounds of the formulae

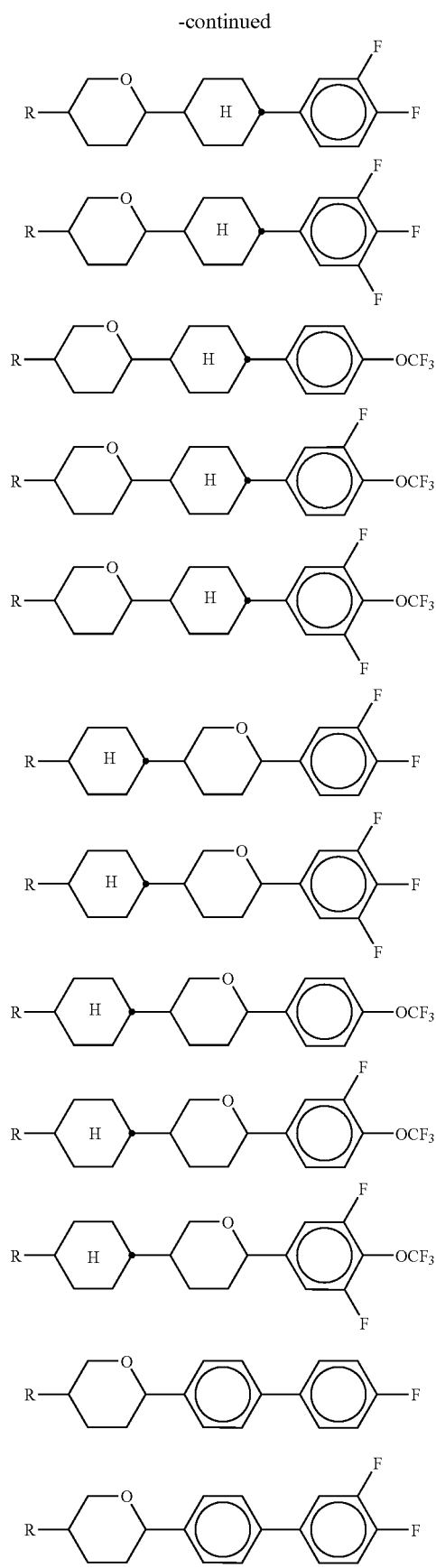
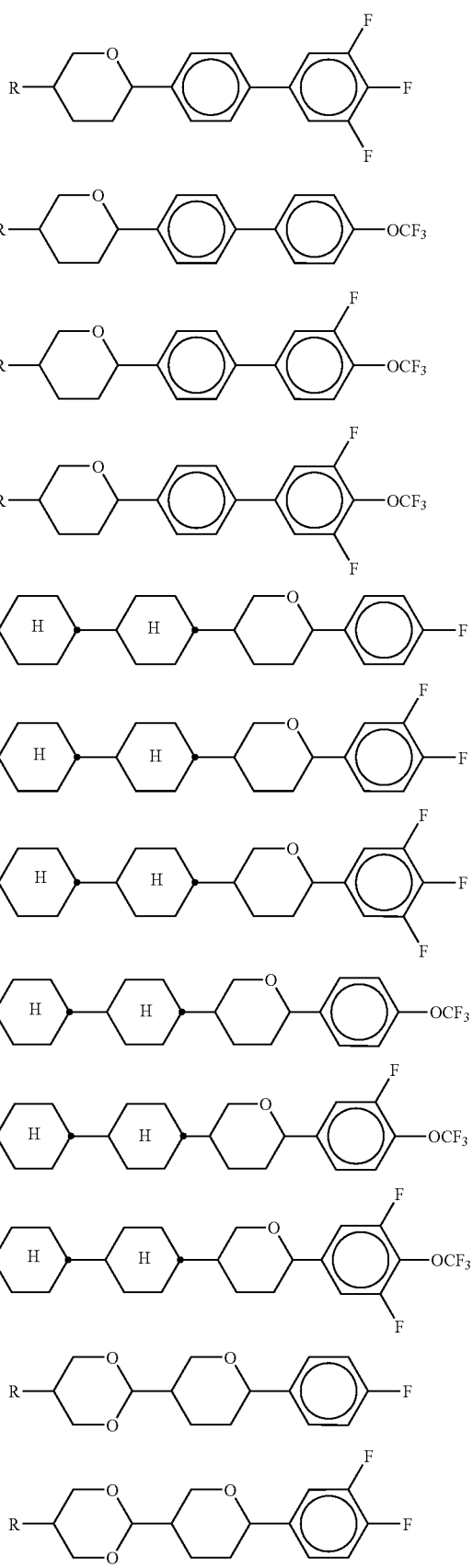

-continued
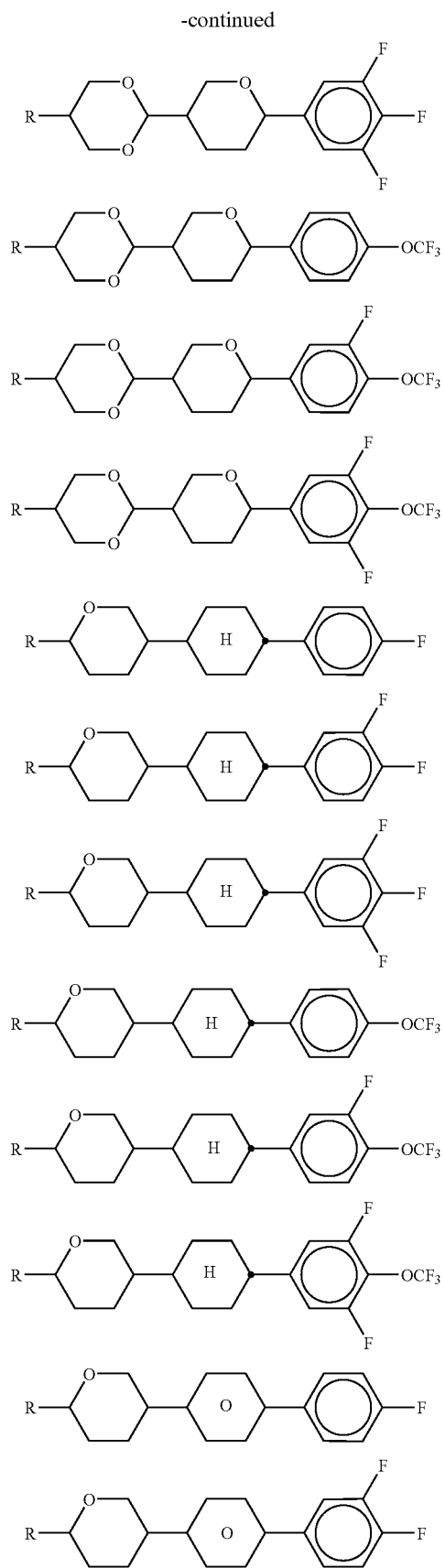
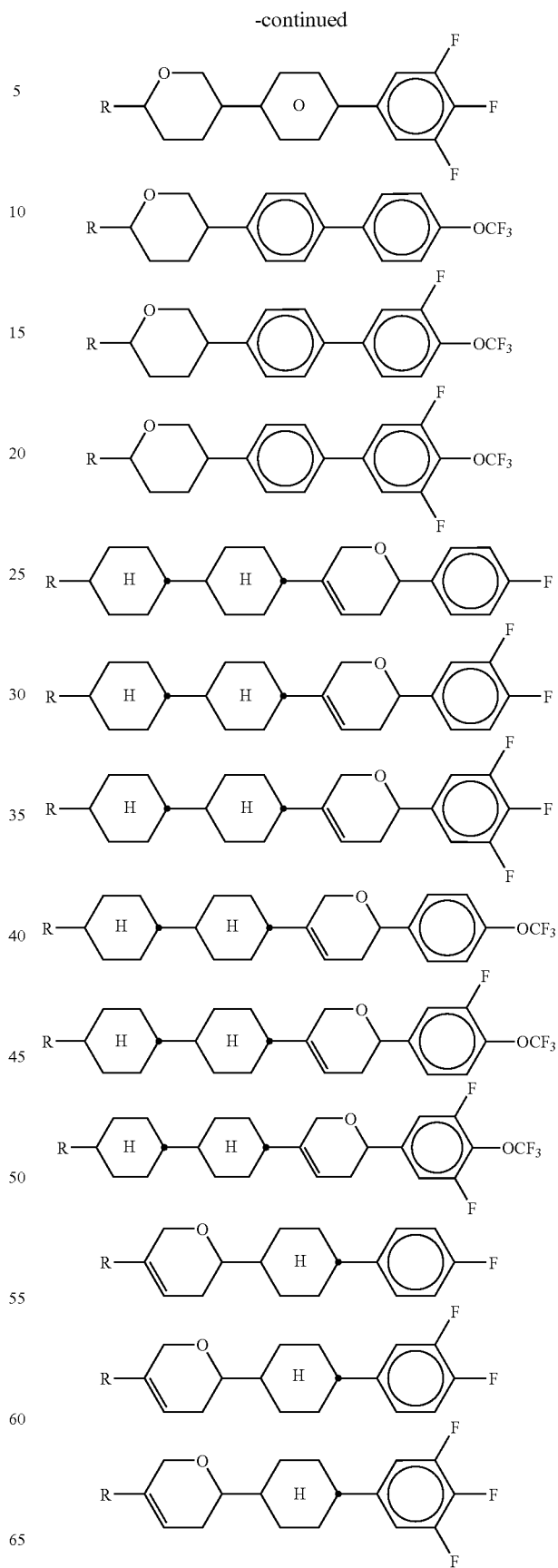

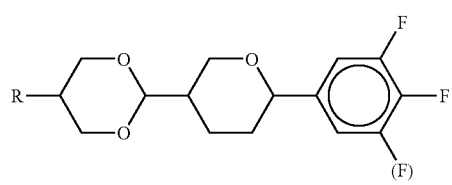
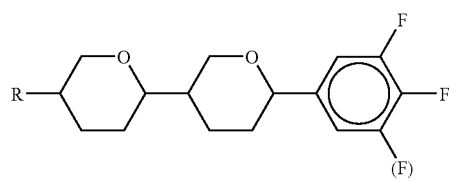
Preferred compounds of the formulae C-1 to C-5 are mentioned below:
C-1a
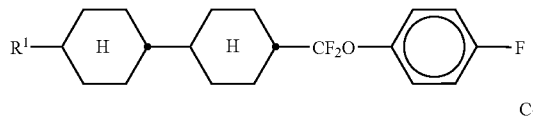
C-1b
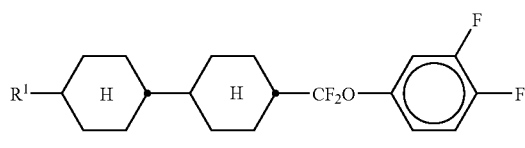
C-1c
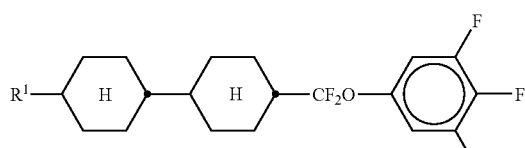
C-1d
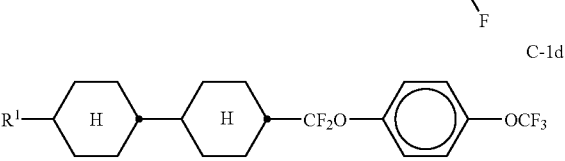
C-1e
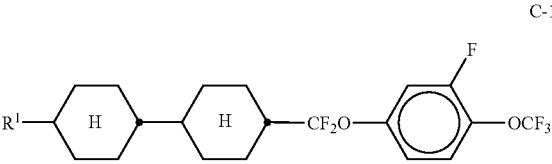
C-1f
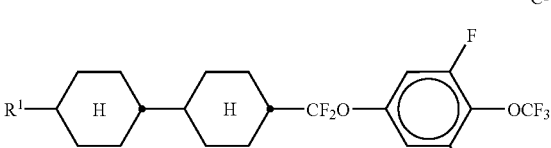
C-2a
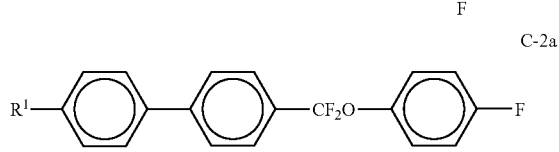
C-2b
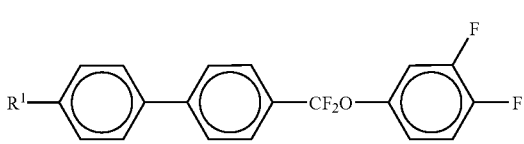
C-2c
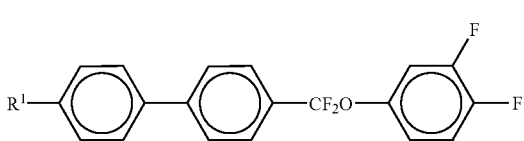
C-2d
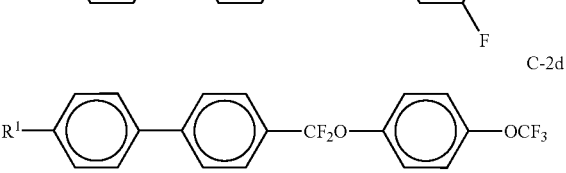
C-2e
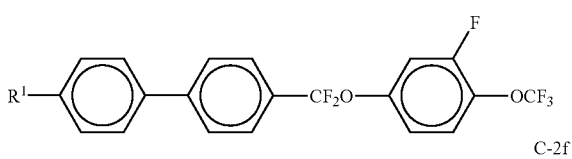
C-2f
C-2g
C-2h
C-2i
C-2j
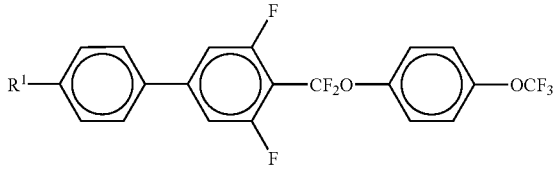

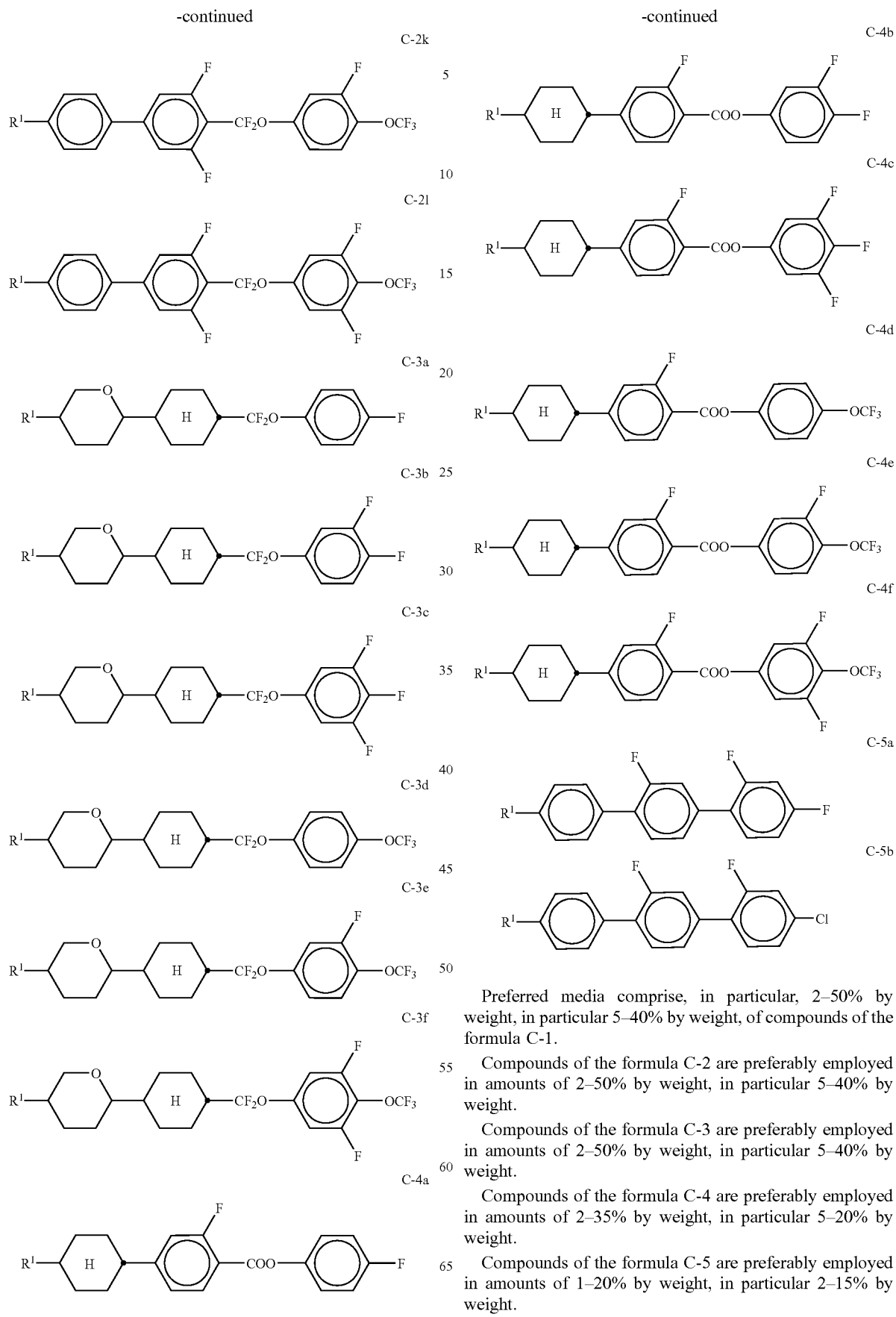

Preferred media comprise, in particular, 2–50% by weight, in particular 5–40% by weight, of compounds of the formula C-1.

Compounds of the formula C-2 are preferably employed in amounts of 2–50% by weight, in particular 5–40% by weight.

Compounds of the formula C-3 are preferably employed in amounts of 2–50% by weight, in particular 5–40% by weight.

Compounds of the formula C-4 are preferably employed in amounts of 2–35% by weight, in particular 5–20% by weight.

Compounds of the formula C-5 are preferably employed in amounts of 1–20% by weight, in particular 2–15% by weight.

The compounds of the formulae I and C-1 to C-5 are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance located in the cell) which contain media of this type and to the use of these media for electro-optical purposes.

The liquid-crystal mixtures according to the invention enable a significant widening of the available parameter latitude.

The achievable combinations of clearing point, optical anisotropy, viscosity at low temperature, thermal and UV stability and dielectric anisotropy are far superior to previous materials from the prior art.

The requirement for a high clearing point, a nematic phase at low temperature, as well as high $\Delta\epsilon$ has hitherto only been met to an inadequate extent. Although liquid-crystal mixtures such as, for example, MLC-6476 and MLC-6625 (Merck KGaA, Darmstadt, Germany) have comparable clearing points and low-temperature stabilities, they have, however, relatively high $\Delta n$ values and also higher threshold voltages of about $\geq 1.7$ V. Other mixture systems have comparable viscosities and values of $\Delta\epsilon$, but only have clearing points in the region of 60° C.

The liquid-crystal mixtures according to the invention, while retaining the nematic phase down to −20° C. and preferably down to −30° C., particularly preferably down to −40° C., enable clearing points above 65° C., preferably above 70° C., particularly preferably above 75° C. and very particularly preferably above 80° C., simultaneously dielectric anisotropy values $\Delta\epsilon$ of $\geq 6$, preferably $\geq 7$, and a high value for the specific resistance to be achieved, enabling excellent STN and MLC displays to be obtained. In particular, the mixtures are characterised by low operating voltages. The TN thresholds are below 1.5 V, preferably below 1.3 V.

It goes without saying that, through a suitable choice of the components of the mixtures according to the invention, it is also possible for higher clearing points (for example above 100° or even above 110°) to be achieved at a higher threshold voltage or lower clearing points to be achieved at lower threshold voltages with retention of the other advantageous properties. At viscosities correspondingly increased only slightly, it is likewise possible to obtain mixtures having greater $\Delta\epsilon$ and thus lower thresholds. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favorable electro-optical properties, such as low angle dependence of the contrast (German Patent 30 22 818), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Mixtures according to the invention having small $\Delta n$ values are particularly suitable for low $V_{th}$, TN-TFT and IPS displays and for reflective or transflective applications. High $\Delta n$ mixtures ($\Delta n>0.13$) are particularly suitable for OCB applications.

The flow viscosity $v_{20}$ at 20° C. is preferably <60 mm$^2\cdot$s$^{-1}$, particularly preferably <50 mm$^2\cdot$s$^{-1}$. The nematic phase range is preferably at least 90°, in particular at least 100°. This range preferably extends at least from −30° to +80°. The rotational viscosity $\gamma_1$ at 20° C. is preferably <200 mPa·s, in particular <190 mPa·s.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than analogous mixtures comprising cyanophenylcyclohexanes of the formula

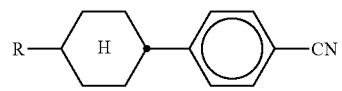

or esters of the formula

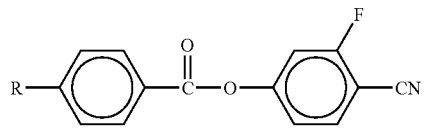

instead of the compounds of the formula I.

The UV stability of the mixtures according to the invention is also considerably better, i.e. they exhibit a significantly smaller decrease in the HR on exposure to UV. The mixtures according to the invention have values for the holding ratio of >98%, in particular >99%.

The media according to the invention are preferably based on one or more (preferably one, two, three or more) compounds of the formula I, i.e. the proportion of these compounds is 2–50%, preferably 2–40% and particularly preferably in the range 2–30%.

The individual compounds of the formulae I to X and C-1 to C-5 and their sub-formulae which can be used in the media according to the invention are either known or they can be prepared analogously to the known compounds.

Preferred embodiments are indicated below:

The medium additionally comprises one or more compounds selected from the group consisting of the general formulae II to XI:

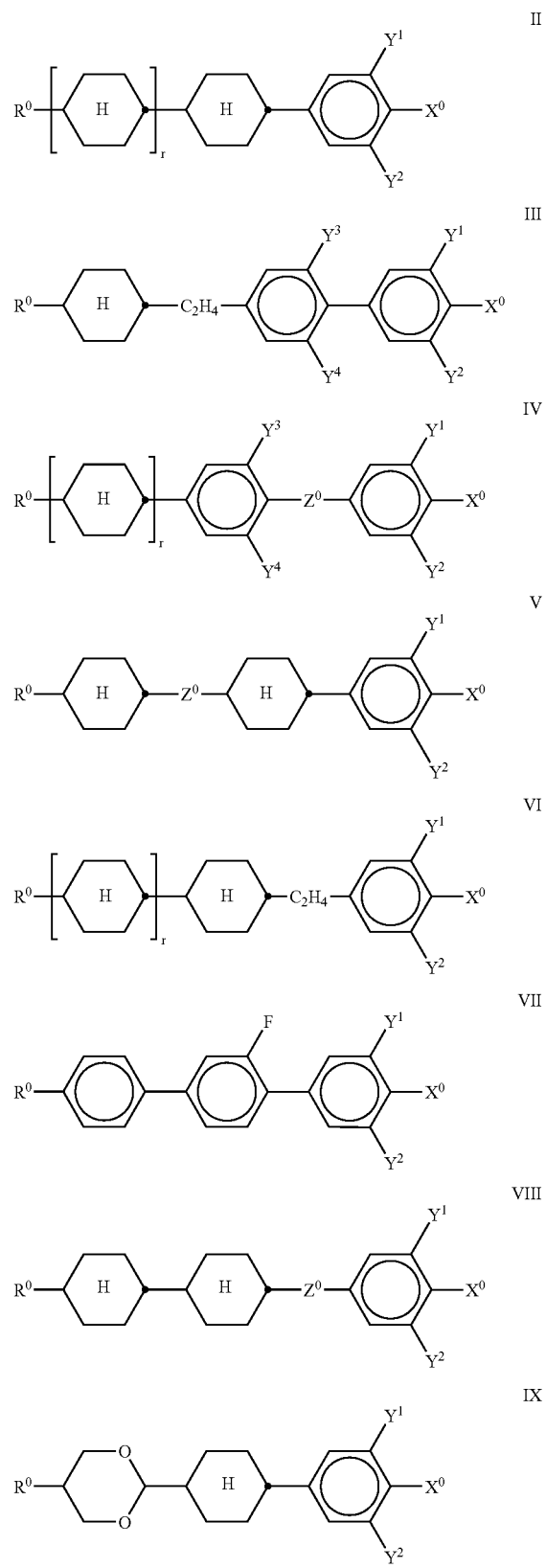

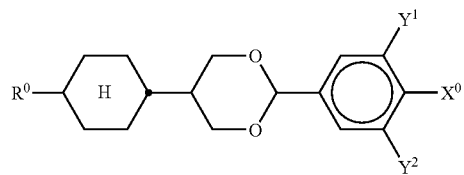

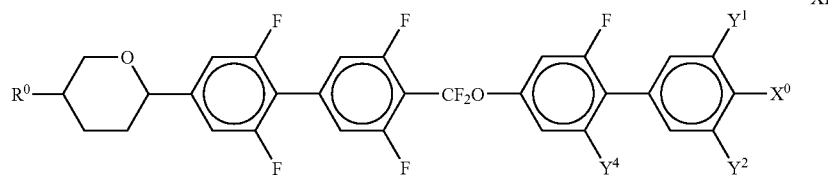

in which the individual radicals have the following meanings:

$R^0$ n-alkyl, alkoxy, oxaalkyl, fluoroalkyl, alkenyloxy or alkenyl having up to 12 carbon atoms, $X^0$ F, Cl, halogenated alkyl, halogenated alkenyl, halogenated alkenyloxy or halogenated alkoxy, each having up to 8 carbon atoms, $Z^0$ —CH=CH—, —$C_2H_4$—, —$CH_2O$—, —$OCH_2$—, —$(CH_2)_4$—, —$C_2F_4$—, —CF=CF—, —C≡C—, —CH=CF—, —CF=CH— or —COO—, $Y^1$, $Y^2$, $Y^3$ and $Y^4$ each, independently of one another, H or F, and r 0 or 1.

The compound of the formula IV is preferably

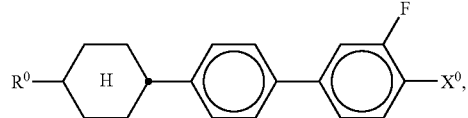

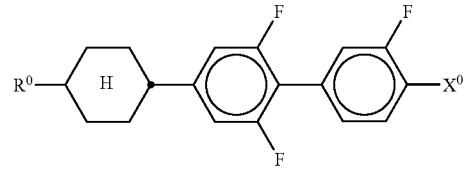

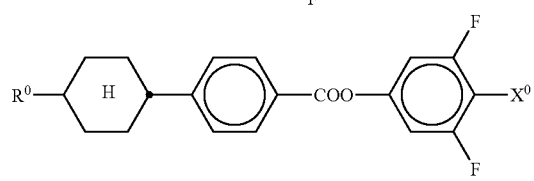

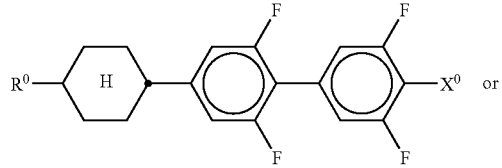

X

XI

-continued

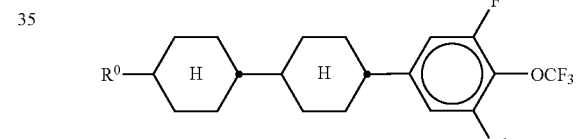

The medium additionally comprises, in particular, one or more compounds of the formulae

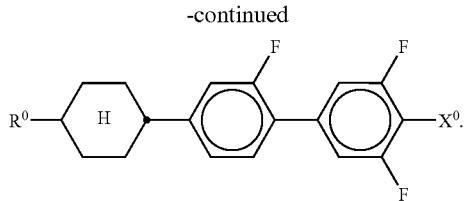

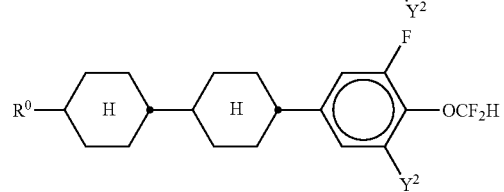

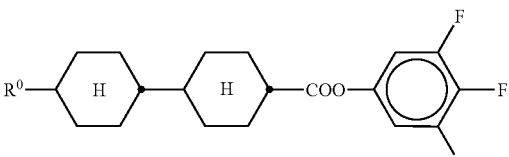

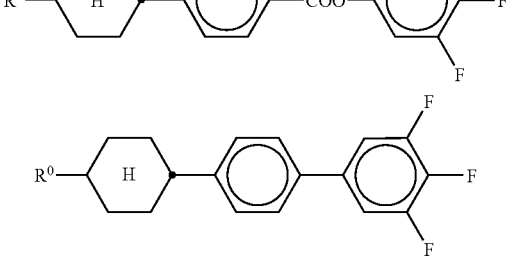

-continued
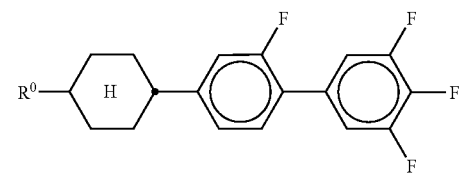
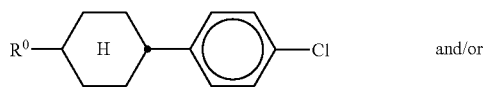
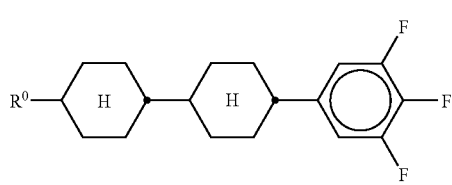
in which $R^0$ and $Y^2$ are as defined above.
The medium preferably comprises one, two or three, furthermore four, homologues of the compounds selected from the group consisting of H1 to H19 (n=1–12)
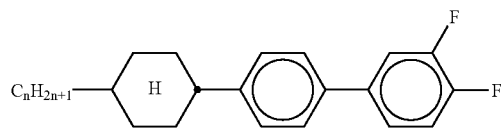
H1
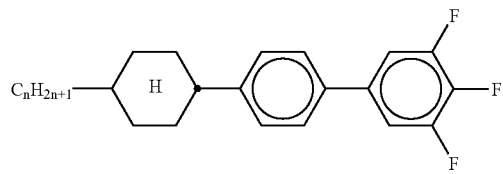
H2
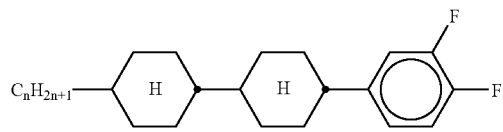
H3
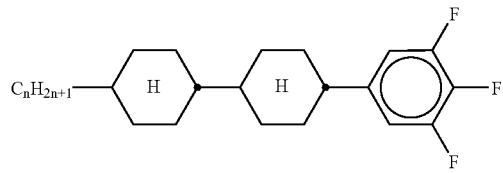
H4
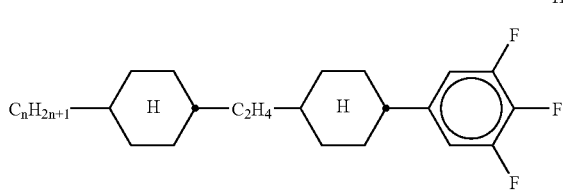
H5
-continued
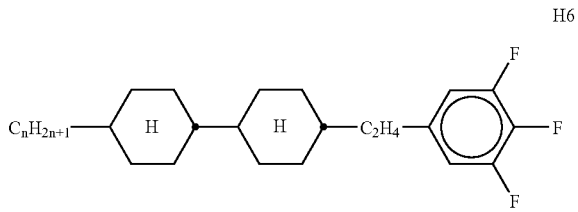
H6
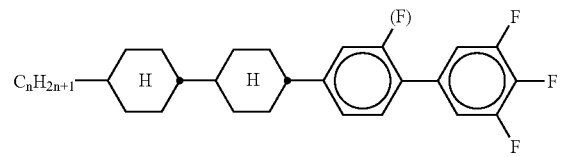
H7
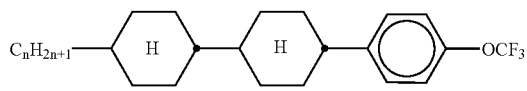
H8
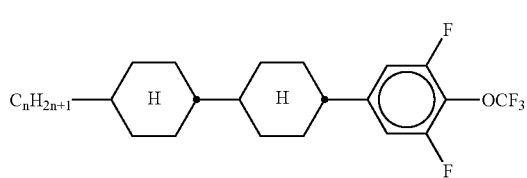
H9
H10
H11
H12
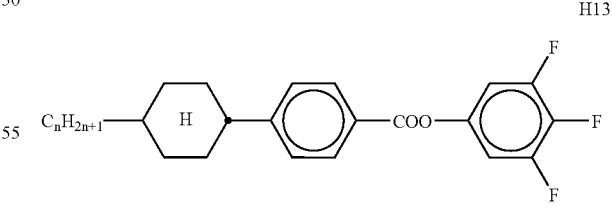
H13
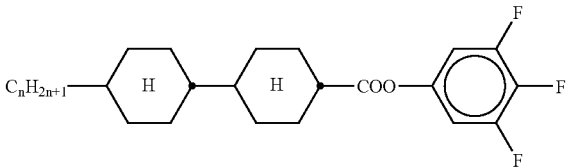
H14

-continued

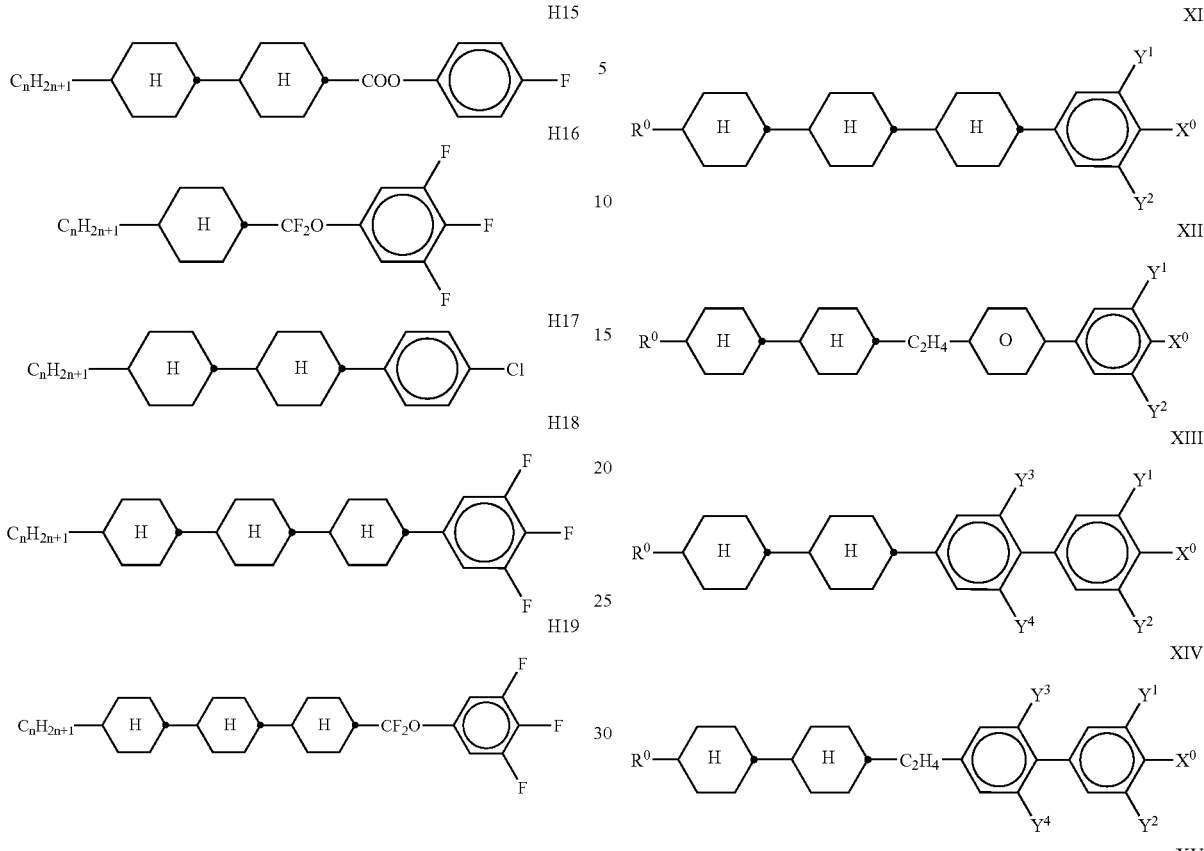

in which n is from 0 to 12, preferably from 0 to 7 and in particular from 1 to 5.

The medium additionally comprises one or more dioxanes of the formulae DI and/or DII in which $R^0$ is as defined in Claim 4. $R^0$ in the compounds of the formulae DI and/or DII is preferably straight-chain alkyl or alkenyl having up to 8 carbon atoms. The medium preferably, in particular for IPS applications, comprises 2–35% by weight, in particular 2–30% by weight and very particularly preferably 2–25% by weight, of compounds of the formulae DI and/or DII.

The medium additionally comprises one or more compounds selected from the group consisting of the general formulae XI to XVI:

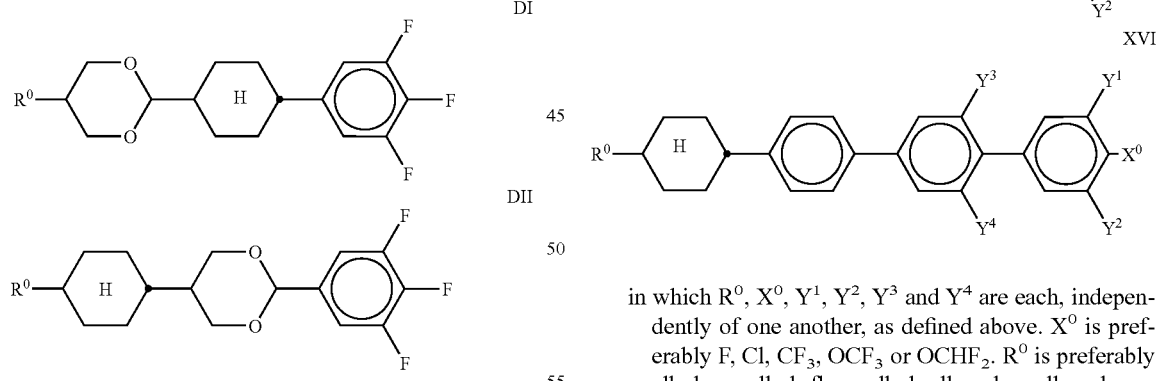

in which $R^0$, $X^0$, $Y^1$, $Y^2$, $Y^3$ and $Y^4$ are each, independently of one another, as defined above. $X^0$ is preferably F, Cl, $CF_3$, $OCF_3$ or $OCHF_2$. $R^0$ is preferably alkyl, oxaalkyl, fluoroalkyl, alkenyl or alkenyloxy.

The proportion of compounds of the formulae C-1 to C-5 and I to X together in the mixture as a whole is at least 50% by weight.

The proportion of compounds of the formula I in the mixture as a whole is from 5 to 50% by weight.

The proportion of compounds of the formulae C-1 to C-5 in the mixture as a whole is from 2 to 50% by weight, preferably from 5 to 50% by weight.

The proportion of compounds of the formulae II to X in the mixture as a whole is from 30 to 70% by weight.

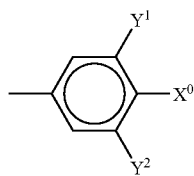
is preferably
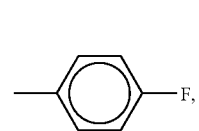 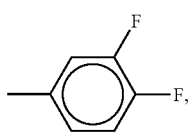
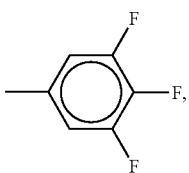 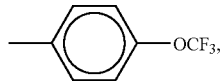
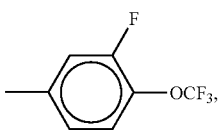 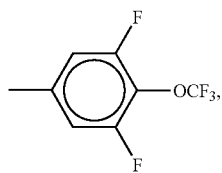
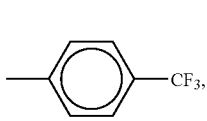 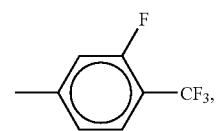
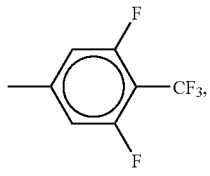 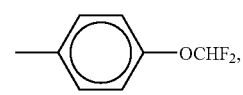
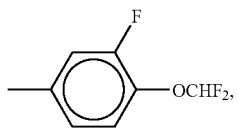 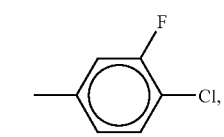
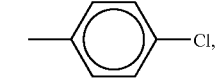 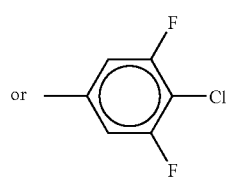
The medium comprises compounds of the formulae II, III, IV, V, VI, VII, VIII, IX and/or X.
$R^0$ is straight-chain alkyl or alkenyl having from 2 to 8 carbon atoms.
The medium essentially consists of compounds of the formulae C-1 to C-5 and I to XVI.
The medium additionally comprises pyran compounds of the formulae P-1 and P-2
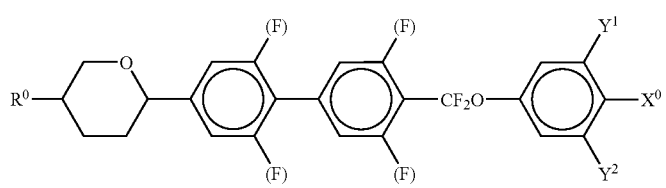
P-1
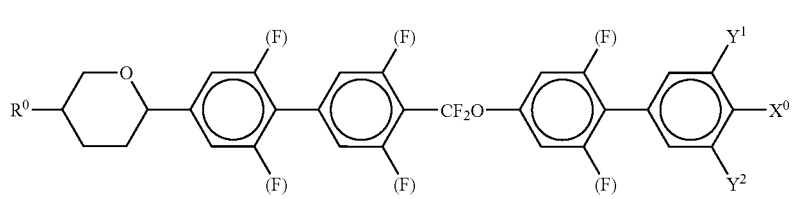
P-2 in which $R^0$, $Y^1$, $Y^2$ and $X^0$ are as defined above. Preferably, $Y^1=Y^2=X^0=F$ in P-1 and P-2.

The medium comprises further compounds, preferably selected from the following group consisting of the general formulae XVII to XX:

XVII

XVIII
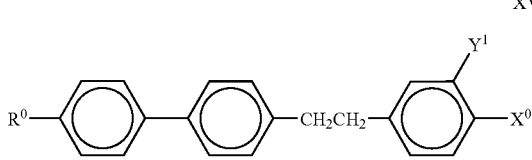

XIX
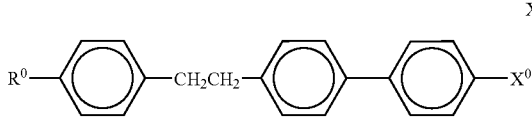

XX
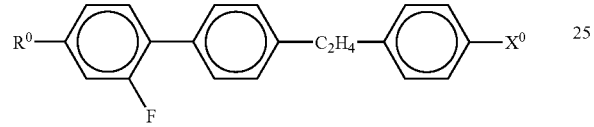

in which $R^0$, $Y^1$ and $X^0$ are as defined above. The 1,4-phenylene rings may additionally be substituted by CN, chlorine or fluorine.

The 1,4-phenylene rings are preferably mono- or polysubstituted by fluorine atoms.

The medium comprises further compounds, preferably selected from the following group consisting of the formulae RI to RXVI RI
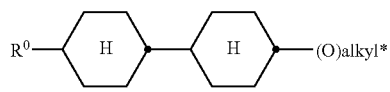

RII
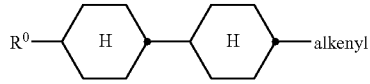

RIII
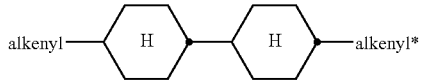

RIV
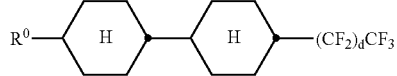

RV
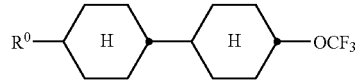

RVI
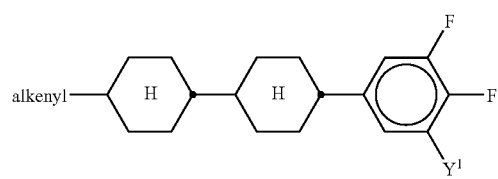

RVII
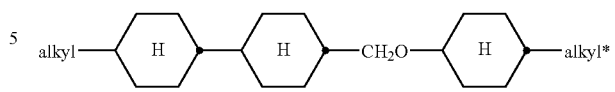

RVIII
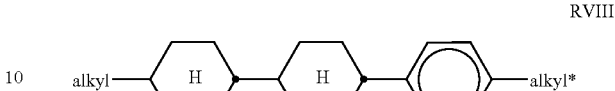

RIX
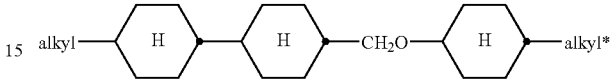

RX
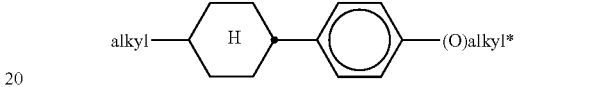

RXI
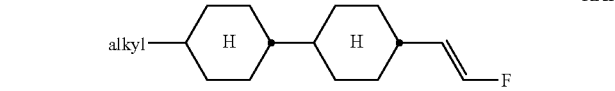

RXII
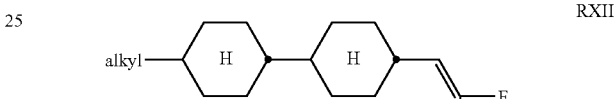

RXIII

RXIV
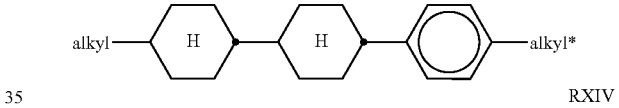

RXV
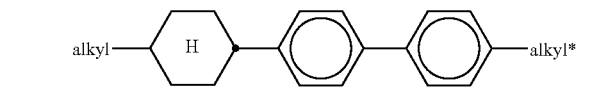

RXVI in which
$R^0$ is n-alkyl, n-alkoxy, oxaalkyl, fluoroalkyl, alkenyloxy or alkenyl having up to 12 carbon atoms,
d is 0, 1 or 2,
$Y^1$ is H or F,
alkyl and alkyl* are each, independently of one another, a straight-chain or branched alkyl radical having from 2 to 8 carbon atoms,
alkenyl and alkenyl* are each, independently of one another, a straight-chain or branched alkenyl radical having from 2 to 8 carbon atoms.

The proportion of compounds of the formulae RI to RXVI in the mixture as a whole is preferably from 2 to 50% by weight, in particular from 2 to 40% by weight.

The medium preferably comprises one or more compounds of the formulae

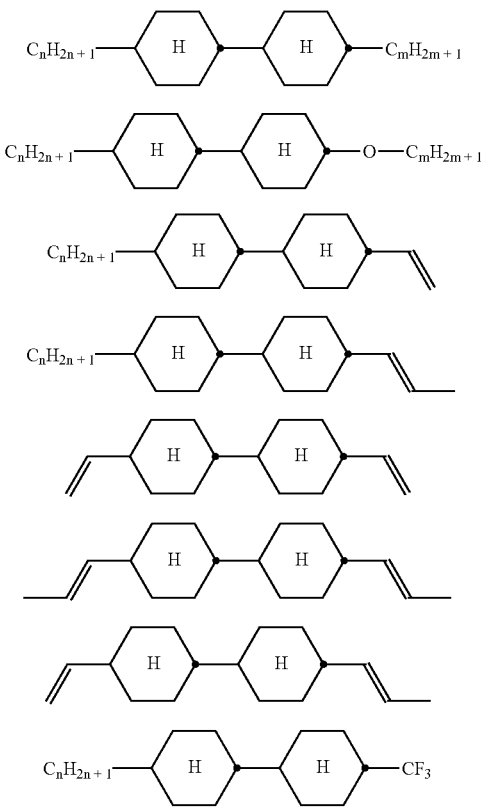

RIa
RIb
RIIa
RIIb
RIIIa
RIIIb
RIIIc
RIVa in which n and m are each an integer from 1 to 8.

The I: (II+III+IV+V+VI+VII+VIII+IX+X) weight ratio is preferably from 1:10 to 10:1.

The medium essentially consists of compounds selected from the group consisting of the general formulae I to XVI and C-1 to C-5.

The medium additionally comprises one or more compounds of the formula RIVa. The proportion in the mixture is preferably 2–20% by weight, in particular 2–15% by weight.

It has been found that even a relatively small proportion of compounds of the formulae I and C-1 to C-5 mixed with conventional liquid-crystal materials, but in particular with one or more compounds of the formulae II, III, IV, V, VI, VII, VIII, IX and/or X, results in a considerable lowering of the threshold voltage and in low birefringence values, with broad nematic phases with low smectic-nematic transition temperatures being observed at the same time, improving the storage stability. The compounds of the formulae I to X are colorless, stable and readily miscible with one another and with other liquid-crystal materials.

The term "alkyl" or "alkyl*" covers straight-chain and branched alkyl groups having from 2 to 8 carbon atoms, in particular the straight-chain groups ethyl, propyl, butyl, pentyl, hexyl and heptyl. Groups having 2–5 carbon atoms are generally preferred.

The term "alkenyl" or "alkenyl*" covers straight-chain and branched alkenyl groups having up to 8 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n is from 1 to 6 and m is from 0 to 6. Preferably, n=1 and m is from 0 to 6.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally give lower threshold voltages and larger values of $k_{33}/k_{11}$ compared with alkyl and alkoxy radicals.

A —$CH_2CH_2$— group in $Z^1$ generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I and C-1 to C-5 and II+III+IV+V+VI+VII+VIII+IX+X depends substantially on the desired properties, on the choice of the components of the formulae I, II, III, IV, V, VI, VII, VIII, IX and/or X, and on the choice of any further components that may be present. Suitable mixing ratios within the range indicated above can easily be determined from case to case.

The total amount of compounds of the formulae C-1 to C-5 and I to XVI in the mixtures according to the invention is not crucial. The mixtures can therefore comprise one or more further components for the purposes of optimisation of various properties. However, the observed effect on the addressing times and the threshold voltage is generally greater, the higher the total concentration of compounds of the formulae C-1 to C-5 and I to XVI.

In a particularly preferred embodiment, the media according to the invention comprise compounds of the formulae II to X (preferably II and/or III) in which $X^0$ is $OCF_3$, $OCHF_2$, F, $OCH=CF_2$, $OCF=CF_2$, $OCF_2CHFCF_3$ or $OCF_2$—$CF_2H$. A favorable synergistic effect with the compounds of the formula I results in particularly advantageous properties.

The mixtures according to the invention having low optical anisotropy ($\Delta n<0.07$) are particularly suitable for reflective displays. Low $V_{th}$ mixtures are particularly suitable for 2.5 V drivers, 3.3 V drivers and 4 V or 5 V drivers. Ester-free mixtures are preferred for the latter applications. The mixtures according to the invention are furthermore suitable for IPS and OCB applications. The mixtures according to the invention having high optical anisotropy ($\Delta n>0.13$) are particularly suitable for OCB applications. Mixtures according to the invention for 5 V monitor applications are distinguished, in particular, by thresholds ≦2.2 V, in particular <1.8 V and very particularly preferably ≦1.5 V.

The construction of the MLC display according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The entire disclosure of all applications, patents and publications, cited herein and of corresponding German application No. 103 594 72.8, filed Dec. 17, 2003 is incorporated by reference herein.

EXAMPLES

The preceding examples can be repeated with similar success by substituting the generically or specifically described reactants and/or operating conditions of this invention for those used in the preceding examples.

The dielectrics may also comprise further additives known to the person skilled in the art and described in the literature. For example, 0–15%, preferably 0.1–10%, in particular 0.1–5%, of pleochroic dyes, UV stabilizer, antioxidants or chiral dopants can be added. Suitable stabilizer and dopants are listed in Tables C and D.

C denotes a crystalline phase, S a smectic phase, $S_C$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. Δn denotes the optical anisotropy and no the refractive index of the ordinary light beam. Δ∈ denotes the dielectric anisotropy (Δ∈=∈$_{∥}$−∈$_{⊥}$, where ∈$_{∥}$ denotes the dielectric constant parallel to the longitudinal molecular axes and ∈$_{⊥}$ the dielectric constant perpendicular thereto). The electro-optical data were measured in a TN cell at the 1st minimum (i.e. at a d·Δn value of 0.5 μm) at 20° C., unless expressly stated otherwise. The optical data were measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. n and m are each, independently of one another, 1, 2, 3, 4, 5, 6, 7, 8, 9, 10, 11, 12, 13, 14 or 15. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_2H_{2s}$— | CN | H | H |
| nAm | $C_nH_{2n+1}$ | COOC$_m$H$_{2m+1}$ | H | H |
| nOCCF$_2$.F.F | $C_nH_{2n+1}$ | OCH$_2$CF$_2$H | F | F |

Preferred mixture components are indicated in Tables A and B.

TABLE A

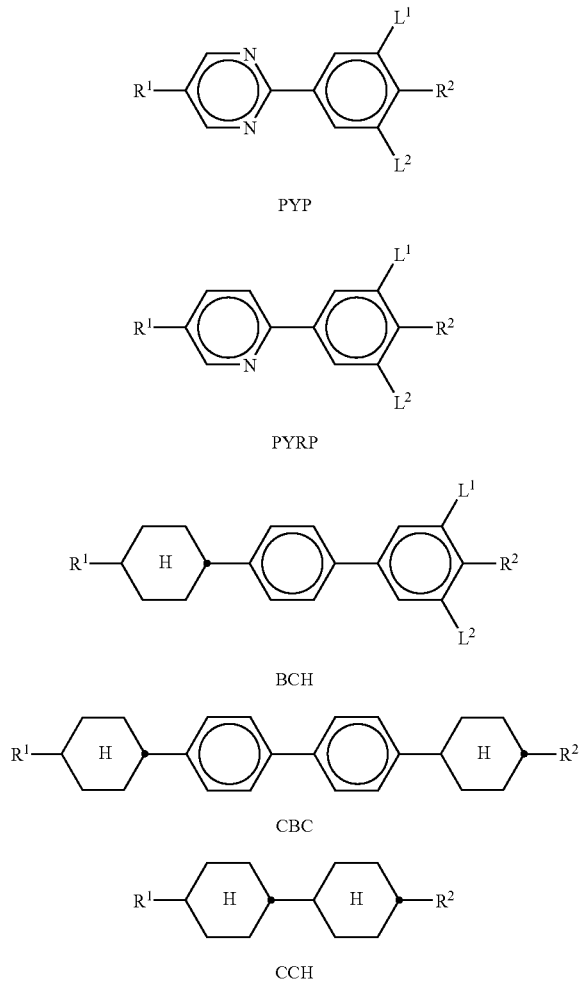

PYP

PYRP

BCH

CBC

CCH

TABLE A-continued
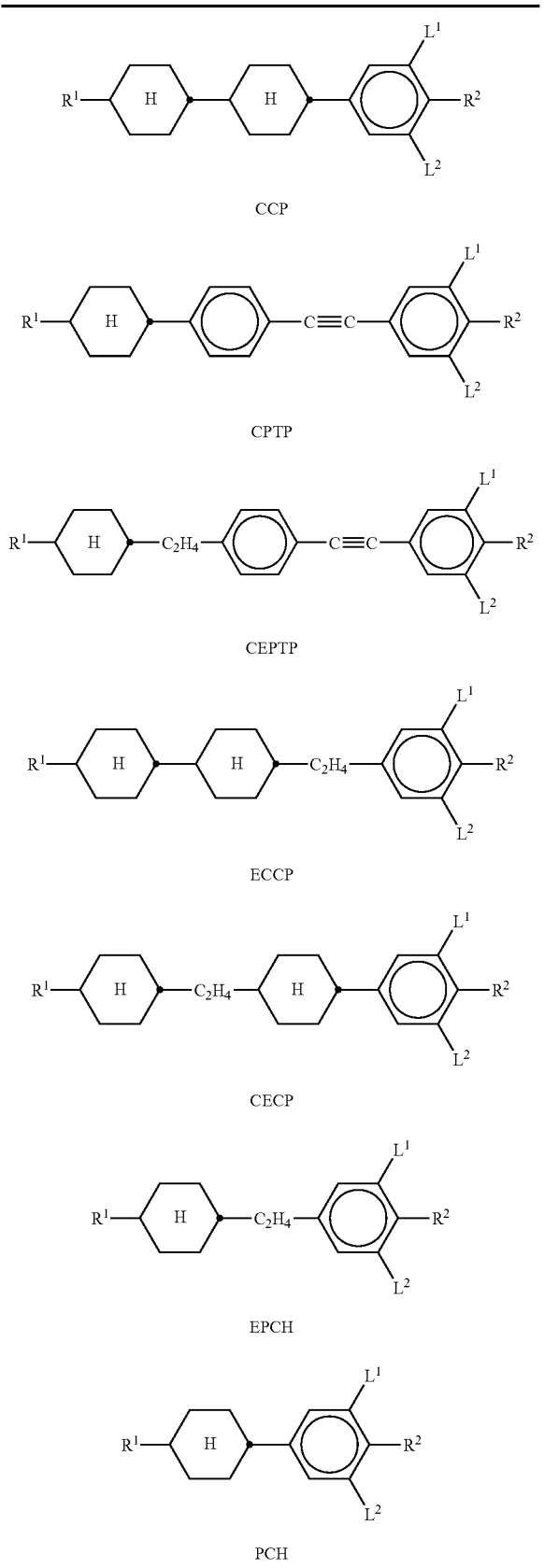
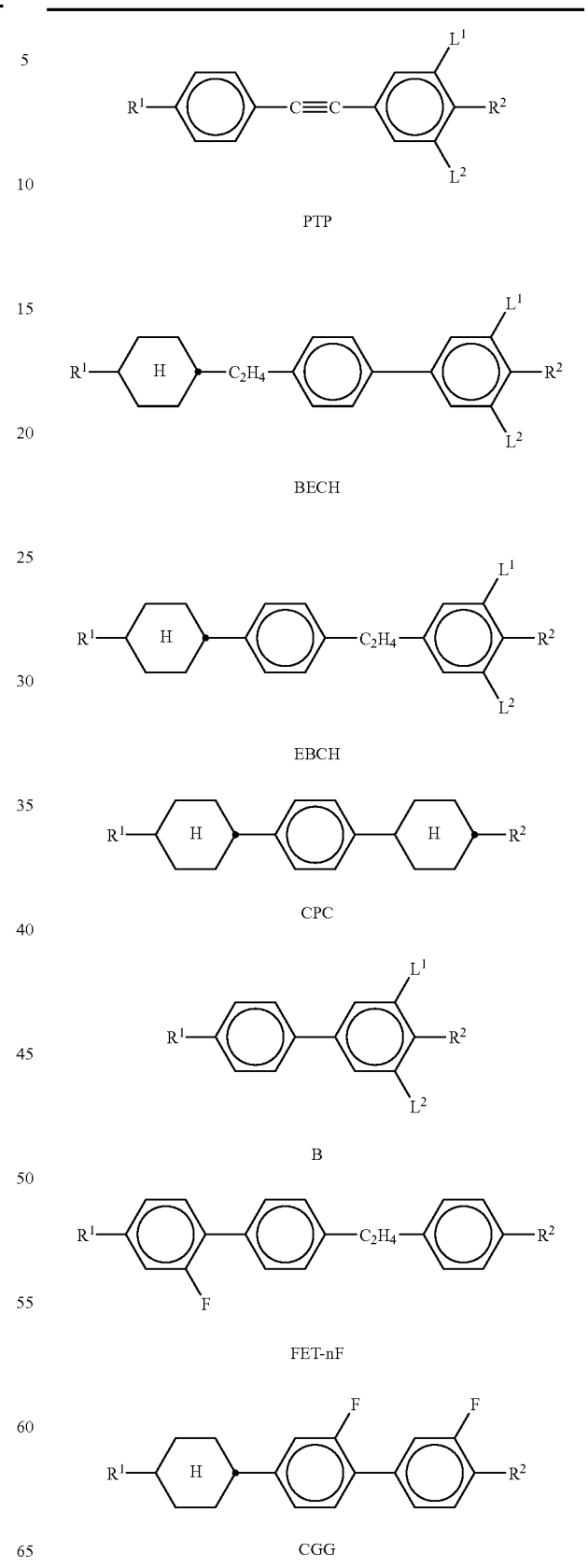

TABLE A-continued

[Structure: R¹–H–(2-F,3-F phenyl)–(3-F phenyl)–R²]

CGU

[Structure: R¹–H–(2,6-diF phenyl)–(L¹,L² phenyl)–R²]

CUP

[Structure: R¹–H–H–CF₂O–(3,5-diF phenyl)–R²]

CCQU

[Structure: R¹–H–C₂F₄–H–CF₂O–(3,5-diF phenyl)–R²]

CWCQU

[Structure: R¹–(3,5-diF phenyl)–CF₂O–(3,5-diF phenyl)–R²]

PUQU

TABLE B $C_nH_{2n+1}$–H–(2-F phenyl)–phenyl–H–$C_mH_{2m+1}$

CBC-nmF $C_nH_{2n+1}$–H–phenyl–$OC_mH_{2m+1}$

PCH-nOm

TABLE B-continued $C_nH_{2n+1}$–phenyl–phenyl–$C_2H_4$–(2-F phenyl)–Cl

FET-nCl $C_nH_{2n+1}$–H–H–COO–phenyl–$OCF_3$

CP-nOCF₃

$C_nH_{2n+1}$–H–H–$OC_mH_{2m+1}$

CCH-nOm $C_nH_{2n+1}$–H–(2-F phenyl)–phenyl–X

BCH-n.FX $C_nH_{2n+1}$–H–$C_2H_4$–phenyl–(2-F phenyl)–$C_mH_{2m+1}$

Inm $C_nH_{2n+1}$–H–phenyl–(2-F phenyl)–H–$C_mH_{2m+1}$

CBC-nmF $C_nH_{2n+1}$–H–$C_2H_4$–phenyl–$C_mH_{2m+1}$

ECCP-nm $C_nH_{2n+1}$–H–H–CH₂O–$C_mH_{2m+1}$

CCH-n1EM $C_nH_{2n+1}$–phenyl–(2-F phenyl)–phenyl–$C_mH_{2m+1}$

T-nFm

TABLE B-continued
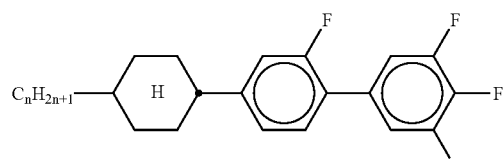
CGU-n-F
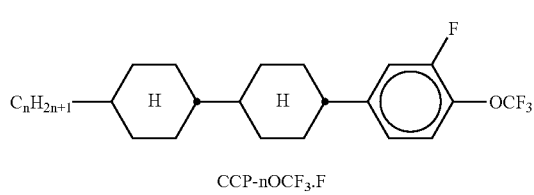
CCP-nOCF$_3$.F
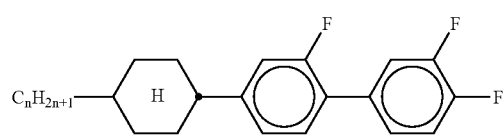
CGG-n-F
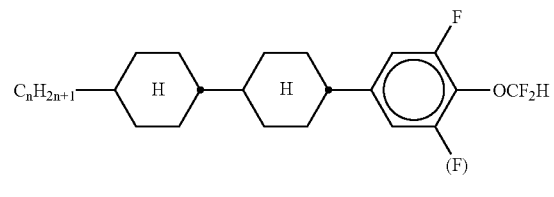
CCP-nOCF$_2$.F(.F)
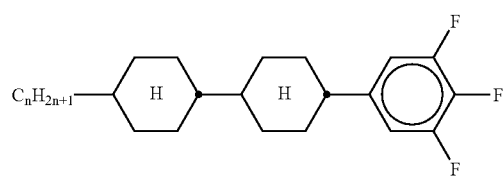
CCP-nF.F.F
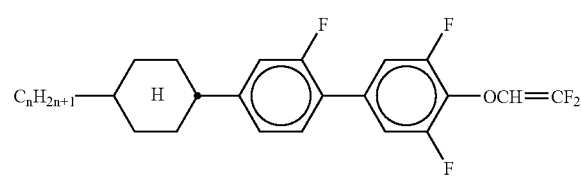
CGU-n-OXF
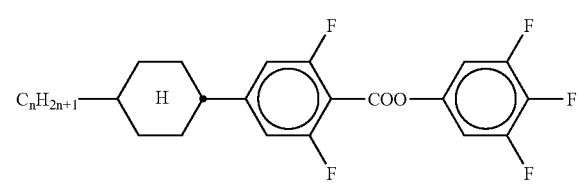
CUZU-n-F
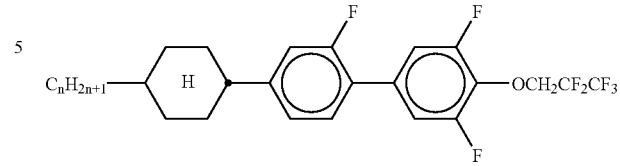
CGU-n-O1DT
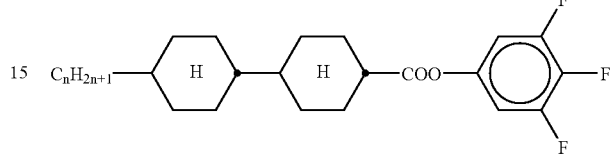
CCZU-n-F
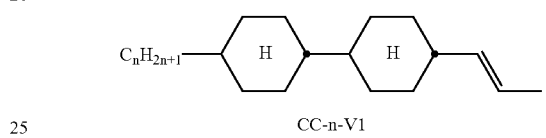
CC-n-V1
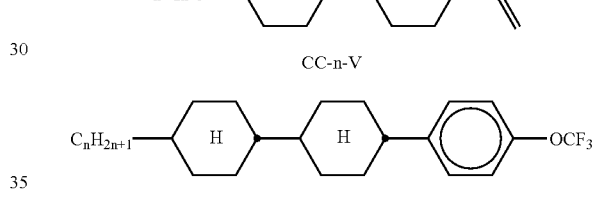
CC-n-V
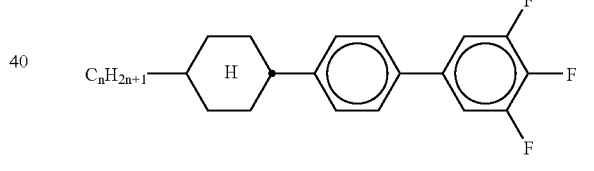
CCP-nOCF$_3$
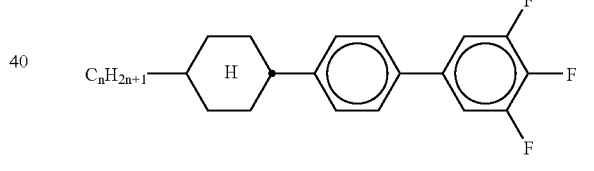
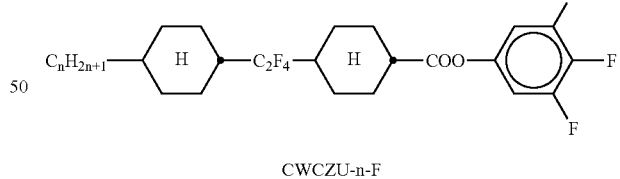
BCH-nF.F.F
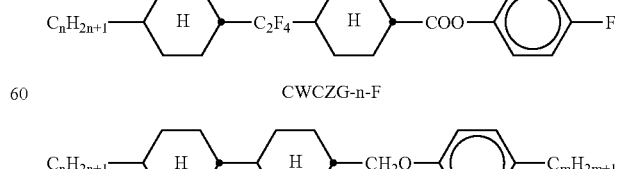
CWCZU-n-F
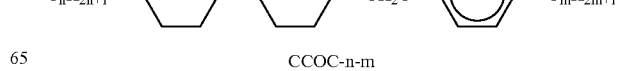
CWCZG-n-F
CCOC-n-m TABLE B-continued CGZU-n-F CUZP-n-OT CUZP-n-F CCQU-n-F

CGU-1V-F

Dec-U-n-F

CCG-V-F

Nap-U-n-F

CGZP-n-F

CWGZG-n-F

UZP-n-N

CWCZG-n-OT

CGZP-n-OT

CWCZP-n-OT

TABLE B-continued
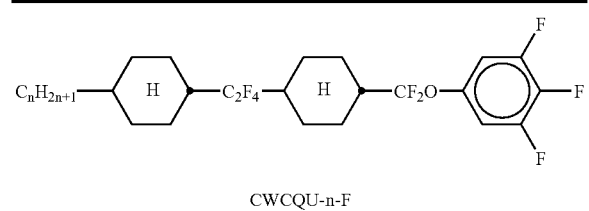
CWCQU-n-F
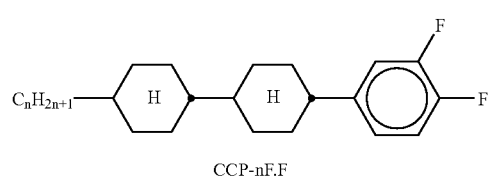
CCP-nF.F
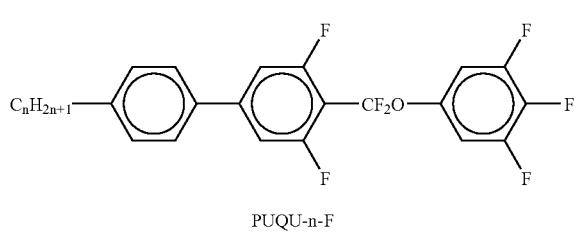
PUQU-n-F
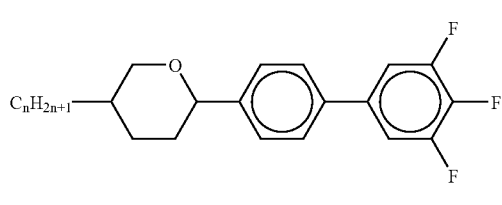
APU-n-F
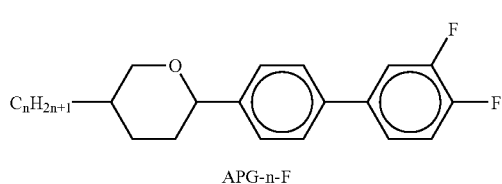
APG-n-F
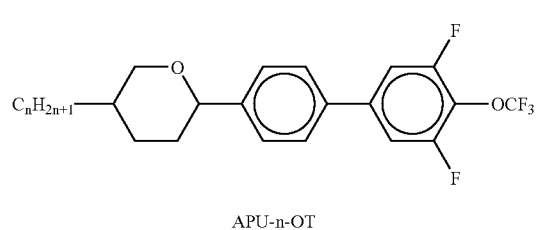
APU-n-OT
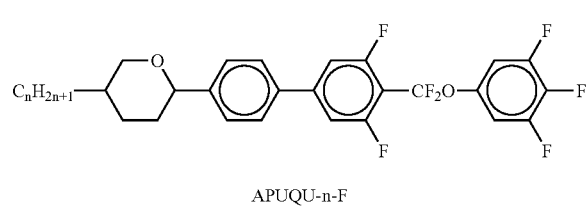
APUQU-n-F
TABLE B-continued
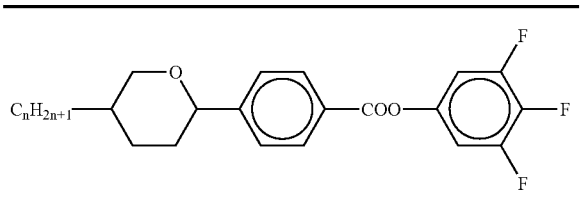
APZU-n-F
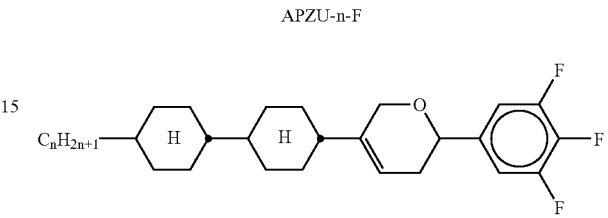
CCA*U-3-F
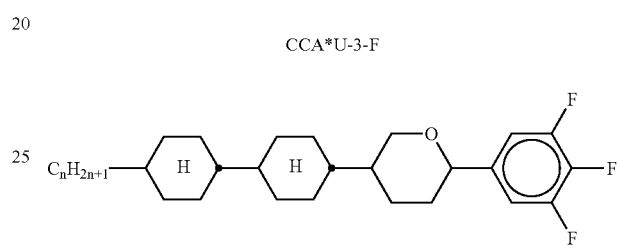
CCAU-n-F
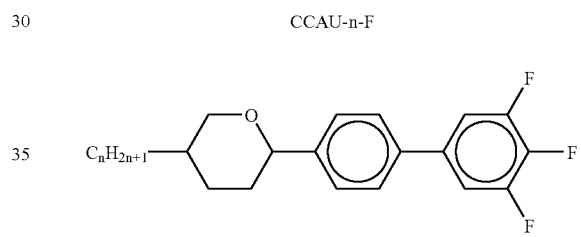
ACU-n-F
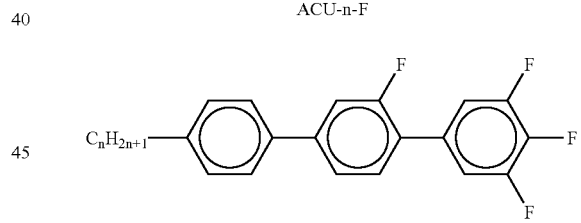
PGU-n-F
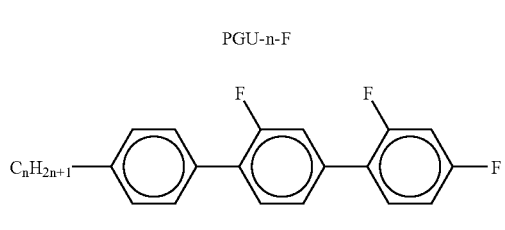
PGIGI-n-F
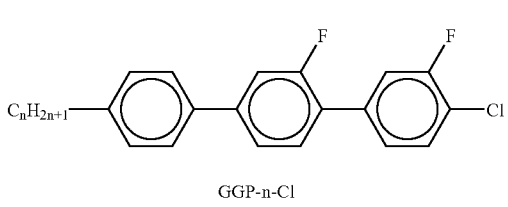
GGP-n-Cl TABLE C
Table C indicates possible dopants which are generally added to the mixtures according to the invention. The dopants are generally added to the mixtures in amounts of from 0.01 to 10% by weight.
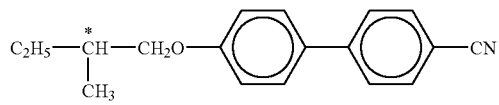
C 15
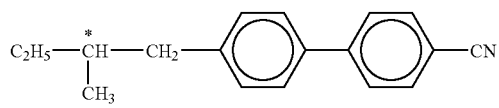
CB 15
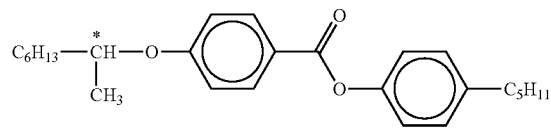
CM 21
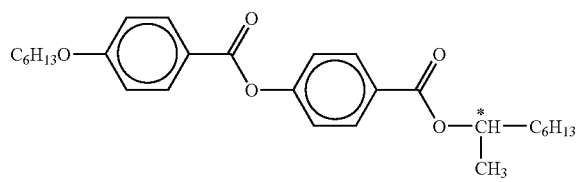
R/S-811
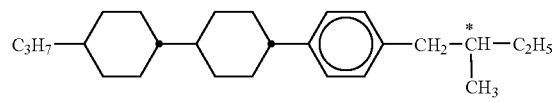
CM 44
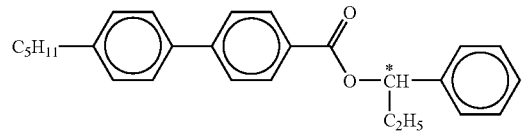
CM 45
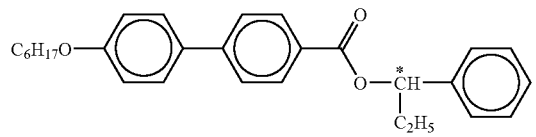
CM 47

TABLE C-continued
Table C indicates possible dopants which are
generally added to the mixtures according to the invention.
The dopants are generally added to the mixtures in
amounts of from 0.01 to 10% by weight.
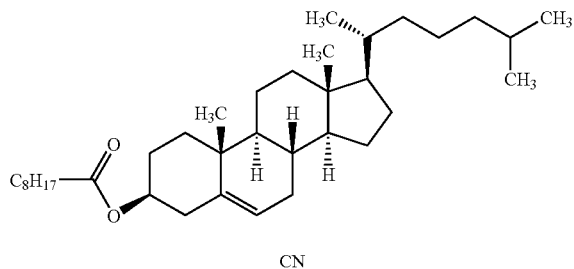
CN
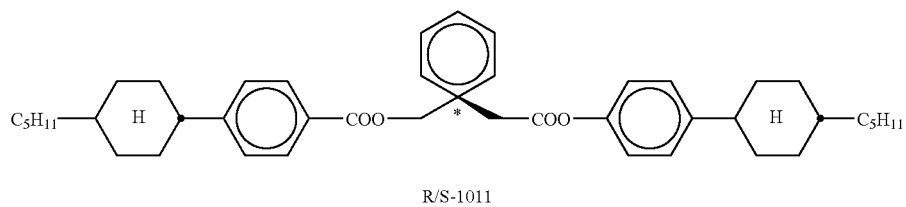
R/S-1011
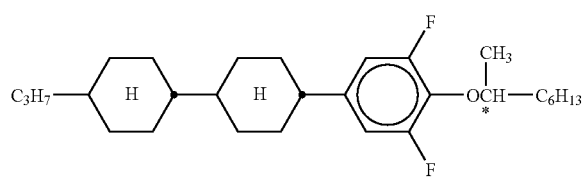
R/S-2011
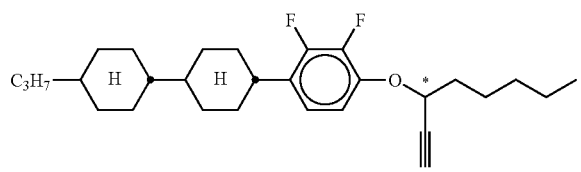
R/S-3011
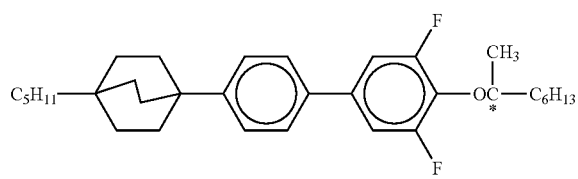
R/S-4011
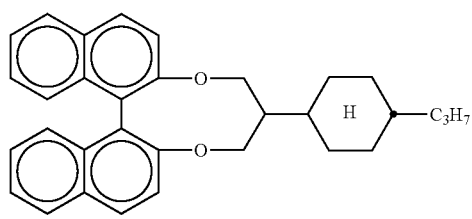
R/S-5011

TABLE D
Stabilizer (such as, for example, UV, antioxidants, free-radical scavengers) which can be added, for example, to the mixtures according to the invention are mentioned below. The stabilizer are preferably added to the mixtures according to the invention in amounts of ≦5% by weight.
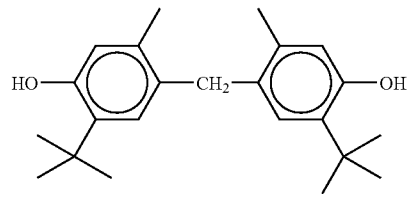
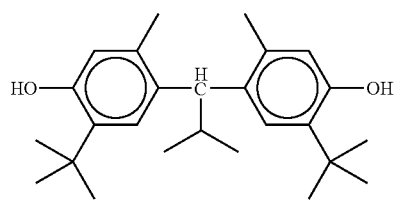
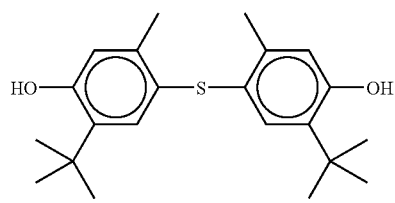
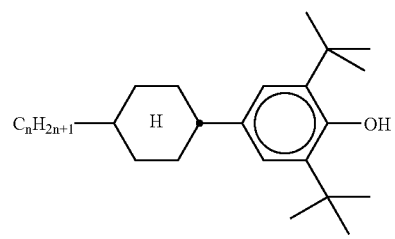
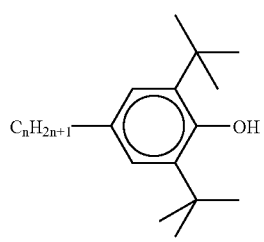
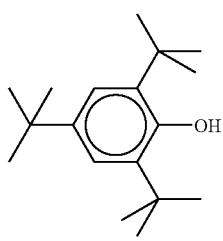

TABLE D-continued
Stabilizer (such as, for example, UV, antioxidants, free-radical scavengers) which can be added, for example, to the mixtures according to the invention are mentioned below. The stabilizer are preferably added to the mixtures according to the invention in amounts of ≦5% by weight.
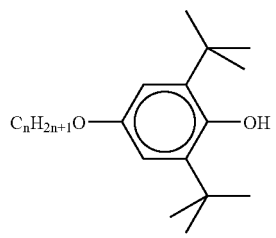
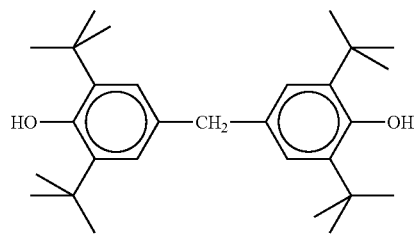
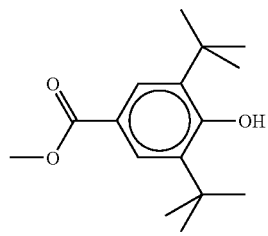
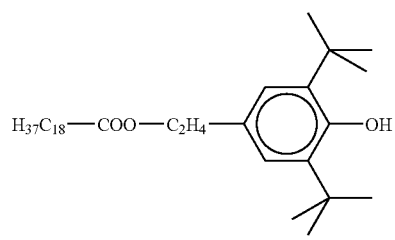
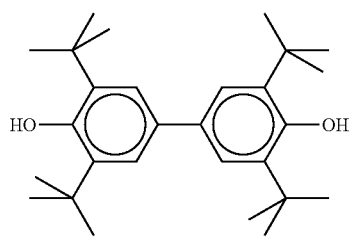

TABLE D-continued
Stabilizer (such as, for example, UV, antioxidants, free-radical scavengers) which can be added, for example, to the mixtures according to the invention are mentioned below. The stabilizer are preferably added to the mixtures according to the invention in amounts of ≦5% by weight.
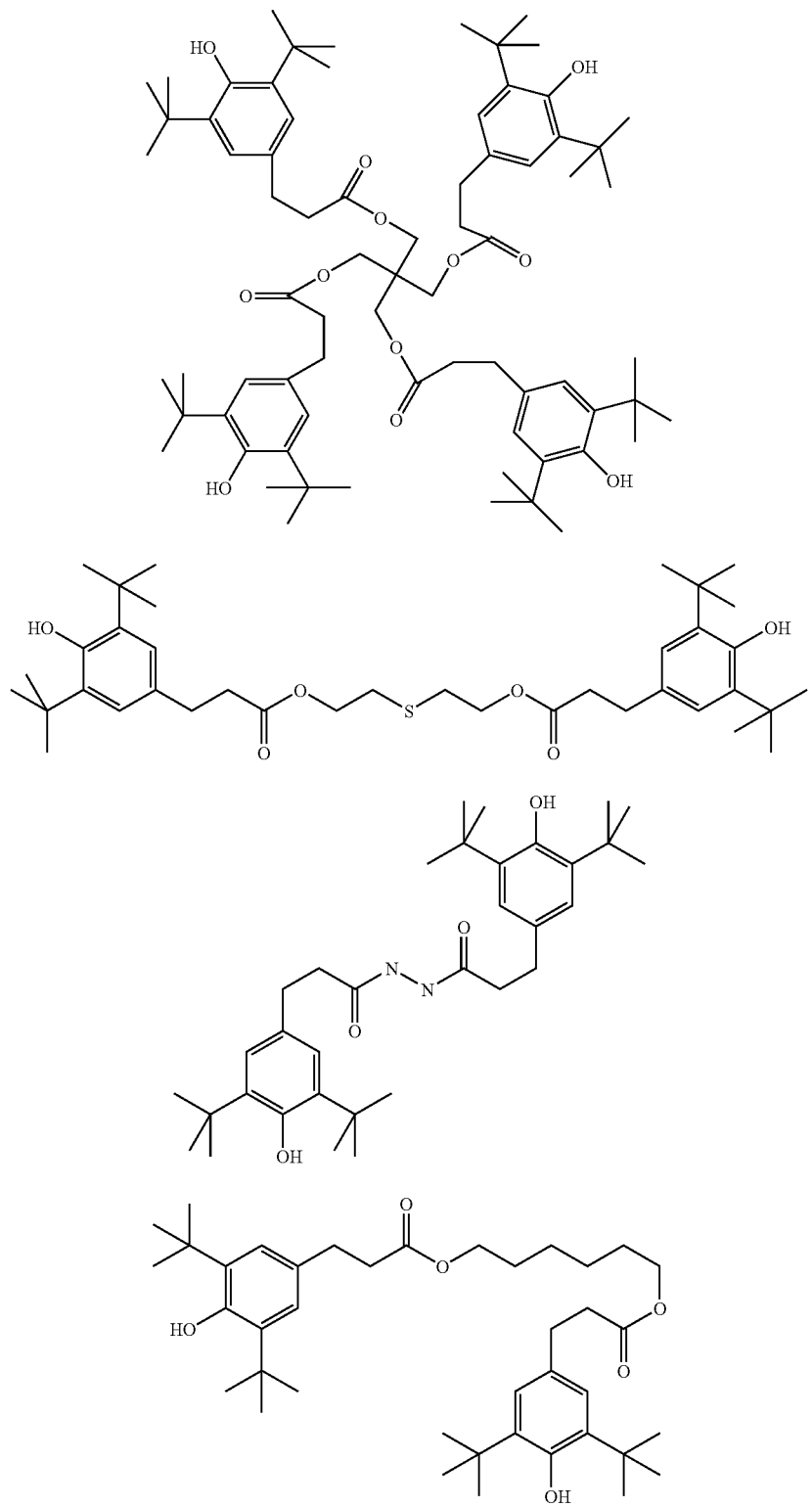

TABLE D-continued
Stabilizer (such as, for example, UV, antioxidants, free-radical scavengers) which can be added, for example, to the mixtures according to the invention are mentioned below. The stabilizer are preferably added to the mixtures according to the invention in amounts of ≦5% by weight.
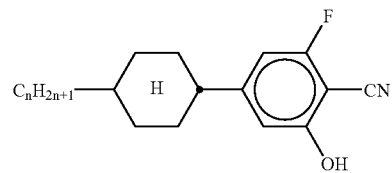
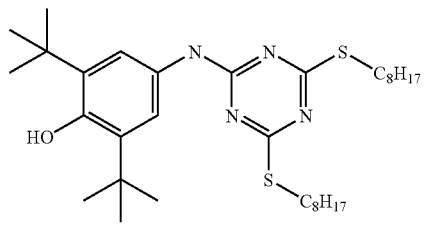
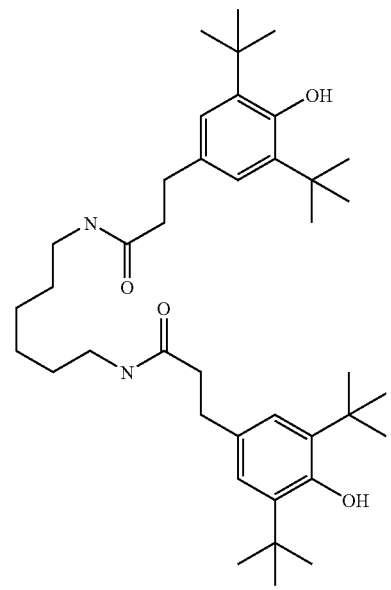
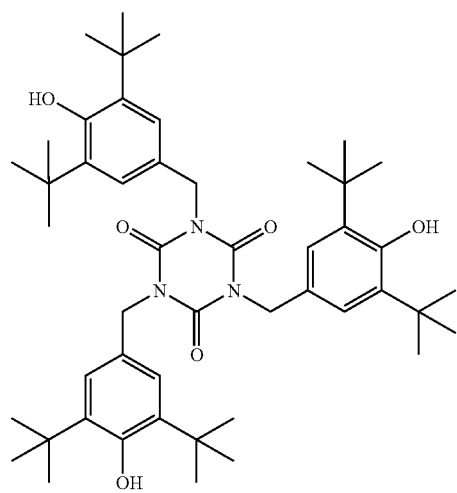

TABLE D-continued
Stabilizer (such as, for example, UV, antioxidants, free-radical scavengers) which can be added, for example, to the mixtures according to the invention are mentioned below. The stabilizer are preferably added to the mixtures according to the invention in amounts of ≦5% by weight.
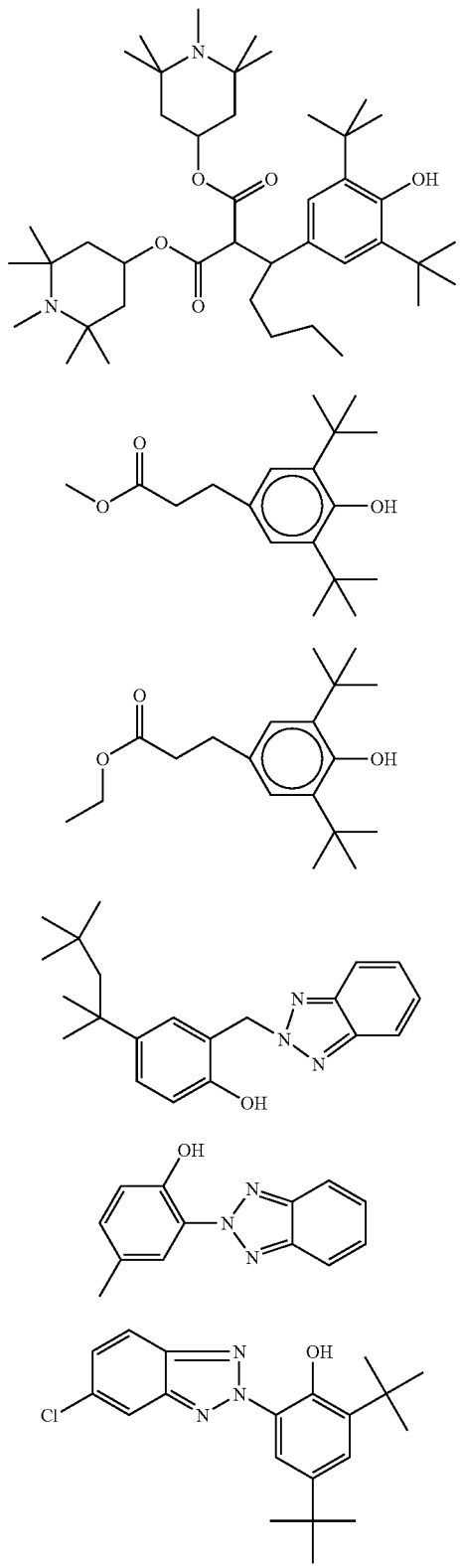

TABLE D-continued
Stabilizer (such as, for example, UV, antioxidants, free-radical scavengers) which can be added, for example, to the mixtures according to the invention are mentioned below. The stabilizer are preferably added to the mixtures according to the invention in amounts of ≦5% by weight.
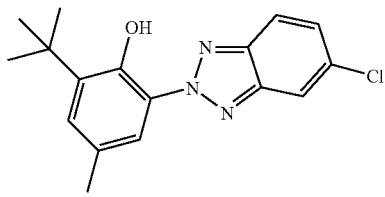
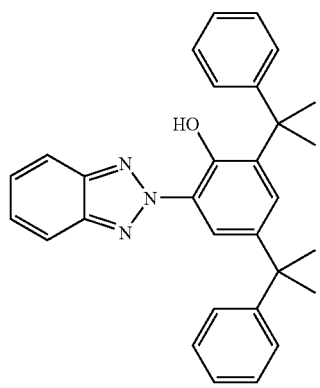
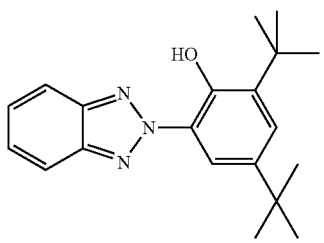
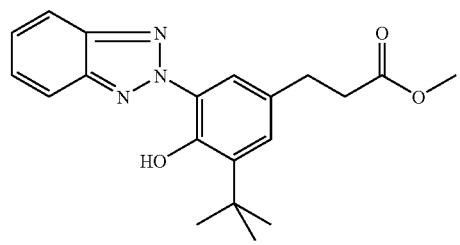
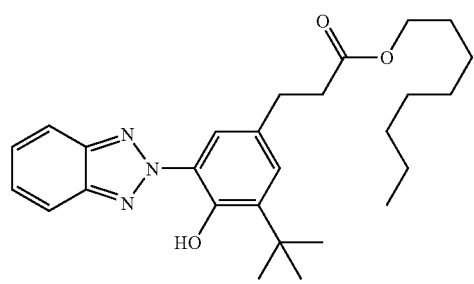

TABLE D-continued
Stabilizer (such as, for example, UV, antioxidants, free-radical scavengers) which can be added, for example, to the mixtures according to the invention are mentioned below. The stabilizer are preferably added to the mixtures according to the invention in amounts of ≦5% by weight.
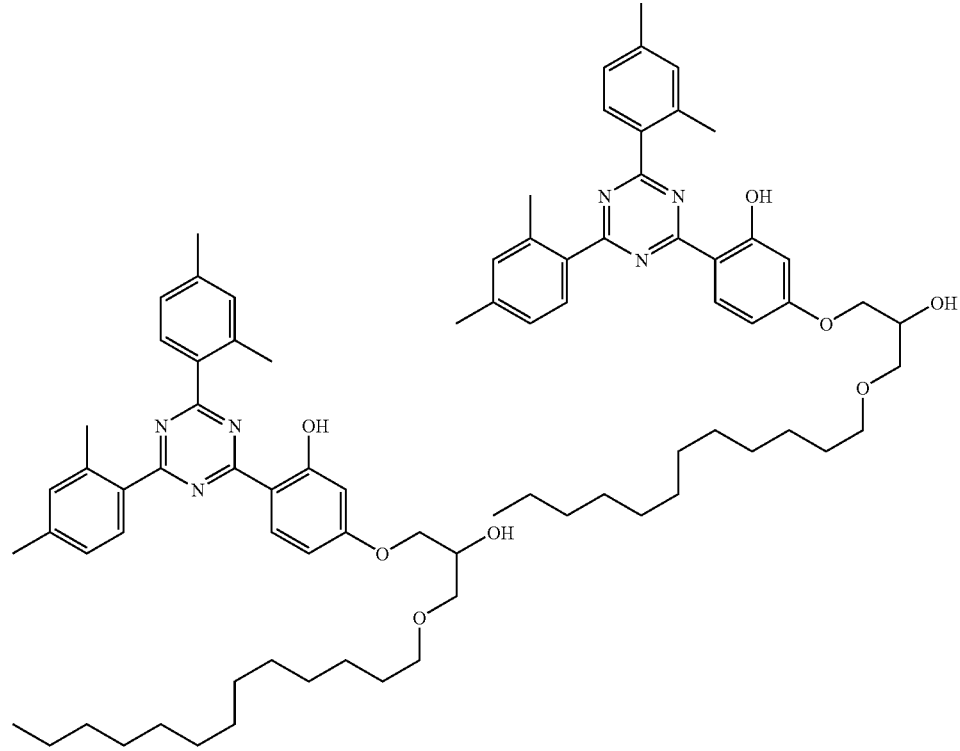
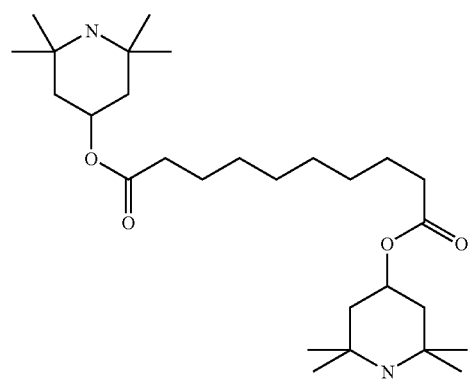

TABLE D-continued

Stabilizer (such as, for example, UV, antioxidants, free-radical scavengers) which can be added, for example, to the mixtures according to the invention are mentioned below. The stabilizer are preferably added to the mixtures according to the invention in amounts of ≦5% by weight.

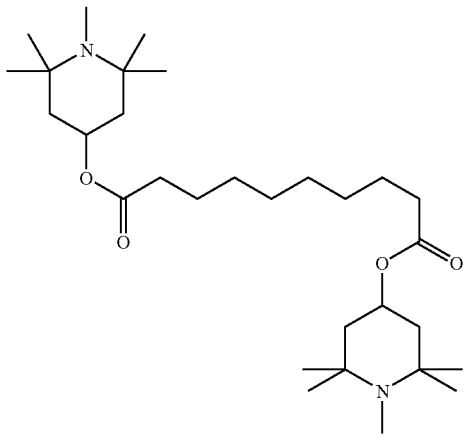

The following examples are intended to explain the invention without restricting it. Above and below, percentages are per cent by weight. All temperatures are given in degrees Celsius. m.p. denotes melting point, cl.p. clearing point. Furthermore, C=crystalline state, N=nematic phase, S=smectic phase and I=isotropic phase. The data between these symbols represent the transition temperatures. Δn denotes optical anisotropy (589 nm, 20° C.), Δ∈ denotes dielectric anisotropy (1 kHz, 20° C.). The flow viscosity $v_{20}$ (mm$^2$/sec) was determined at 20° C. The rotational viscosity $\gamma_1$ (mPa·s) was likewise determined at 20° C.

Mixture Examples

Example M1

| | | | |
|---|---|---|---|
| CC-3-V1 | 9.00% | Clearing point [° C.]: | 80 |
| CCP-1F.F.F | 5.00% | Δn [589 nm, 20° C.]: | 0.137 |
| CCP-2F.F.F | 2.00% | Δ∈ [1 kHz, 20° C.]: | 14.3 |
| CCP-3OCF$_3$ | 8.00% | $\gamma_1$ [mPa · s]: | 170 |
| CCP-4OCF$_3$ | 3.00% | V$_{10}$ [V] | 0.92 |
| PGU-2-F | 9.00% | | |
| PGU-3-F | 9.00% | | |
| PGU-5-F | 9.00% | | |
| CGZP-2-OT | 9.00% | | |
| CGZP-3-OT | 6.00% | | |
| CCGU-3-F | 5.00% | | |
| APUQU-2-F | 10.00% | | |
| ACU-3-F | 1.00% | | |
| APU-3-OT | 7.00% | | |
| APU-3-F | 8.00% | | |

Example M2

| | | | |
|---|---|---|---|
| CDU-2-F | 9.50% | Clearing point [° C.]: | 75.0 |
| CDU-3-F | 2.00% | Δn [589 nm, 20° C.]: | 0.0964 |
| PGU-2-F | 9.50% | Δ∈ [1 kHz, 20° C.]: | 12.5 |
| PGU-3-F | 5.50% | $\gamma_1$ [mPa · s]: | 109 |
| CGZP-2-OT | 7.00% | | |
| CGZP-3-OT | 5.00% | | |
| CCZU-2-F | 4.00% | | |
| CCZU-3-F | 15.00% | | |
| CC-5-V | 10.00% | | |
| CC-3-V1 | 11.00% | | |
| CCP-2OCF$_3$ | 4.00% | | |
| CCP-3OCF$_3$ | 8.00% | | |
| ACU-2-F | 9.50% | | |

Example M3

| | | | |
|---|---|---|---|
| PGU-2-F | 9.00% | Clearing point [° C.]: | 80.5 |
| PGU-3-F | 6.00% | Δn [589 nm, 20° C.]: | 0.1096 |
| CGZP-2-OT | 9.00% | Δ∈ [1 kHz, 20° C.]: | 11.0 |
| CGZP-3-OT | 7.00% | $\gamma_1$ [mPa · s]: | 106 |
| CCZU-2-F | 4.00% | | |
| CCZU-3-F | 12.00% | | |
| APU-2-F | 10.00% | | |
| BCH-2F.F | 4.00% | | |
| CCGU-3-F | 6.00% | | |
| CC-3-V1 | 12.00% | | |
| CC-5-V | 18.00% | | |
| PCH-302 | 3.00% | | |

Example M4 (IPS Mixture)

| | | | |
|---|---|---|---|
| CDU-2-F | 9.50% | Clearing point [° C.]: | 78.5 |
| CDU-3-F | 9.50% | Δn [589 nm, 20° C.]: | 0.0779 |
| DAU-3-F | 5.00% | Δ∈ [1 kHz, 20° C.]: | 10.1 |
| CCZU-2-F | 4.00% | $\gamma_1$ [mPa · s]: | 91 |
| CCZU-3-F | 15.00% | | |
| CGZP-2-OT | 5.00% | | |
| PUQU-2-F | 4.00% | | |

-continued

| | |
|---|---|
| PUQU-3-F | 4.00% |
| CC-3-V1 | 11.00% |
| CC-5-V | 17.00% |
| CCH-35 | 5.00% |
| CCP-V-1 | 11.00% |

Example M5 (IPS Mixture)

| | | | |
|---|---|---|---|
| DAU-3-F | 6.50% | Clearing point [° C.]: | 66.5 |
| CCZU-2-F | 4.00% | Δn [589 nm, 20° C.]: | 0.0745 |
| CCZU-3-F | 13.00% | Δε [1 kHz, 20° C.]: | 7.3 |
| CCQU-2-F | 6.00% | $\gamma_1$ [mPa · s]: | 65 |
| CDU-2-F | 4.00% | | |
| PUQU-2-F | 4.00% | | |
| PUQU-3-F | 6.50% | | |
| CCP-V-1 | 10.00% | | |
| CC-3-V1 | 12.00% | | |
| CC-5-V | 15.00% | | |
| PCH-302 | 8.00% | | |
| CC-4-V | 11.00% | | |

Example M6

| | | | |
|---|---|---|---|
| CCH-5CF$_3$ | 8.00% | Clearing point [° C.]: | 79.2 |
| CCP-2F.F.F | 7.00% | Δn [589 nm, 20° C.]: | 0.0658 |
| CCP-3F.F.F | 7.00% | Δε [1 kHz, 20° C.]: | 12.8 |
| CCP-5F.F.F | 2.00% | $\gamma_1$ [mPa · s]: | 155 |
| ACQU-3-F | 13.00% | | |
| ACQU-4-F | 12.00% | | |
| CCAU-3-F | 3.00% | | |
| CCZU-2-F | 5.00% | | |
| CCZU-3-F | 13.00% | | |
| CCZU-5-F | 4.00% | | |
| CCH-501 | 4.00% | | |
| CDU-3-F | 8.00% | | |
| CDU-5-F | 8.00% | | |
| CCOC-3-3 | 2.00% | | |
| CCOC-4-3 | 2.00% | | |
| CCOC-3-5 | 2.00% | | |

Example M7

| | | | |
|---|---|---|---|
| CCP-1F.F.F | 5.00% | Clearing point [° C.]: | 78.6 |
| CCP-2F.F.F | 8.00% | Δn [589 nm, 20° C.]: | 0.0791 |
| CCP-3F.F.F | 6.00% | Δε [1 kHz, 20° C.]: | 10.3 |
| CCP-5F.F.F | 5.00% | $\gamma_1$ [mPa · s]: | 154 |
| CCP-20CF$_3$.F | 12.00% | | |
| CCP-30CF$_3$.F | 9.00% | | |
| CCP-50CF$_3$.F | 12.00% | | |
| CCOC-3-3 | 1.50% | | |
| CCOC-4-3 | 1.50% | | |
| CBC-33 | 5.00% | | |
| ACQU-3-F | 10.00% | | |
| ACU-3-F | 8.00% | | |
| CGU-2-F | 5.00% | | |
| CGU-3-F | 4.00% | | |
| CCH-3CF$_3$ | 8.00% | | |

Example M8

| | | | |
|---|---|---|---|
| CCH-35 | 4.00% | Clearing point [° C.]: | 75.5 |
| CCQU-1-F | 17.00% | Δn [589 nm, 20° C.]: | 0.0879 |
| CCQU-2-F | 15.00% | Δε [1 kHz, 20° C.]: | 13.6 |
| CCP-1F.F.F | 2.00% | $\gamma_1$ [mPa · s]: | 136 |
| CCQU-3-F | 9.00% | $V_{10}$ [V]: | 1.05 |
| CCP-20CF$_3$ | 2.00% | | |
| CCP-40CF$_3$ | 5.00% | | |
| CCZU-2-F | 4.00% | | |
| CCZU-3-F | 15.00% | | |
| APUQU-2-F | 2.00% | | |
| ACQU-3-F | 10.00% | | |
| ACU-2-F | 8.00% | | |
| ACU-3-F | 7.00% | | |

Example M9

| | | | |
|---|---|---|---|
| CCH-301 | 4.00% | Clearing point [° C.]: | 94.5 |
| CCH-501 | 7.00% | Δn [589 nm, 20° C.]: | 0.0658 |
| CCH-3CF$_3$ | 4.00% | Δε [1 kHz, 20° C.]: | 8.4 |
| CCH-5CF$_3$ | 5.00% | $\gamma_1$ [mPa · s]: | 186 |
| CCP-2F.F.F | 8.00% | $V_{10}$ [V]: | 1.56 |
| CCP-3F.F.F | 6.00% | | |
| CCP-5F.F.F | 5.00% | | |
| CCP-20CF$_3$.F | 8.00% | | |
| CCP-50CF$_3$.F | 6.00% | | |
| CCOC-3-3 | 3.00% | | |
| CCOC-3-5 | 2.00% | | |
| CCOC-4-3 | 4.00% | | |
| CCQU-2-F | 10.00% | | |
| CCQU-3-F | 11.00% | | |
| CCQU-5-F | 8.00% | | |
| CCAU-3-F | 9.00% | | |

Example M10 (IPS Mixture)

| | | | |
|---|---|---|---|
| CDU-2-F | 7.00% | Clearing point [° C.]: | 81.0 |
| CCP-30CF$_3$ | 5.00% | Δn [589 nm, 20° C.]: | 0.0855 |
| CCZU-2-F | 4.00% | Δε [1 kHz, 20° C.]: | 10.1 |
| CCZU-3-F | 11.00% | $\gamma_1$ [mPa · s]: | 97 |
| CCP-V-1 | 10.00% | | |
| CCQU-3-F | 10.50% | | |
| PUQU-2-F | 4.00% | | |
| PUQU-3-F | 5.00% | | |
| CC-3-V1 | 11.00% | | |
| CCH-35 | 5.00% | | |
| CC-5-V | 9.50% | | |
| APG-3-F | 8.00% | | |
| ACU-3-F | 10.00% | | |

Example M11 (IPS Mixture)

| | | | |
|---|---|---|---|
| PGU-2-F | 7.00% | Clearing point [° C.]: | 80.0 |
| CGZP-2-OT | 10.00% | Δn [589 nm, 20° C.]: | 0.1088 |
| CGZP-3-OT | 7.00% | Δε [1 kHz, 20° C.]: | 11.1 |
| CCP-20CF$_3$ | 6.00% | $\gamma_1$ [mPa · s]: | 102 |
| CCP-30CF$_3$ | 8.00% | | |
| PUQU-2-F | 4.00% | | |
| PUQU-3-F | 3.00% | | |

-continued

| | |
|---|---|
| CCQU-3-F | 8.00% |
| CC-3-V1 | 12.00% |
| CC-5-V | 10.00% |
| PCH-302 | 5.50% |
| APG-3-F | 10.50% |
| APU-3-F | 9.00% |

Example M12 (OCB Mixture)

| | | | |
|---|---|---|---|
| BCH-2F.F | 12.00% | Clearing point [° C.]: | 80.5 |
| BCH-3F.F | 10.00% | Δn [589 nm, 20° C.]: | 0.1632 |
| BCH-5F.F | 11.00% | Δε [1 kHz, 20° C.]: | 11.7 |
| BCH-3F.F.F | 9.00% | $\gamma_1$ [mPa · s]: | 186 |
| PGU-2-F | 7.00% | $V_{10}$ [V]: | 1.10 |
| PGU-3-F | 7.00% | | |
| PGU-5-F | 4.00% | | |
| BCH-32 | 7.00% | | |
| CCP-V-1 | 6.00% | | |
| PCH-302 | 3.00% | | |
| PGIGI-3-F | 3.00% | | |
| GGP-5-Cl | 8.00% | | |
| APU-2-F | 5.00% | | |
| APU-3-F | 8.00% | | |

The following examples are intended to explain the invention without restricting it. Above and below, percentages are per cent by weight. All From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium based on a mixture of polar compounds of positive dielectric anisotropy, which comprises one or more pyran compounds of the formula I:

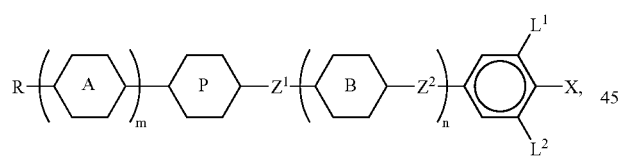

I and one or more compounds selected from the group consisting of the compounds of formulae C-1 to C-5:

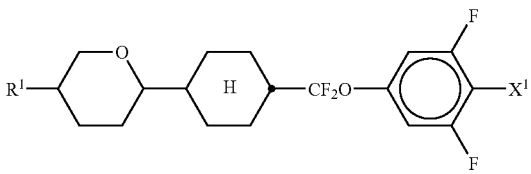

C-1

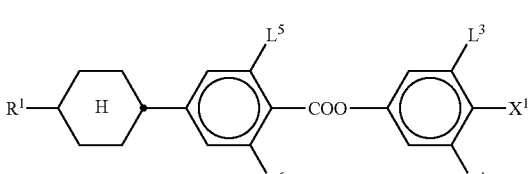

C-2

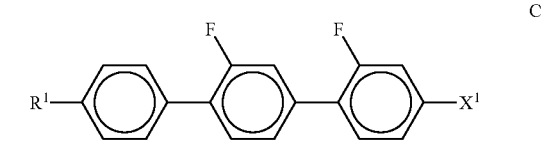

C-3

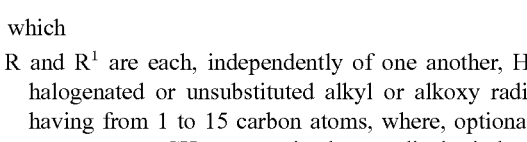

C-4

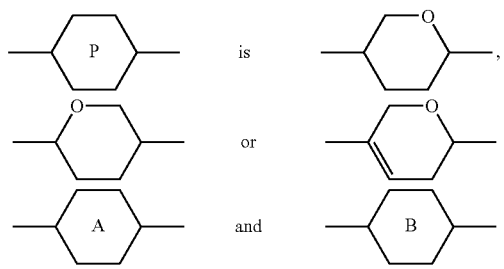

C-5 in which

R and $R^1$ are each, independently of one another, H, a halogenated or unsubstituted alkyl or alkoxy radical having from 1 to 15 carbon atoms, where, optionally, one or more $CH_2$ groups in these radicals, independently of one another, are replaced by —C≡C—, —CH=CH—, —O—, —CO—O— or —O—CO— in such a way that O atoms are not linked directly to one another,

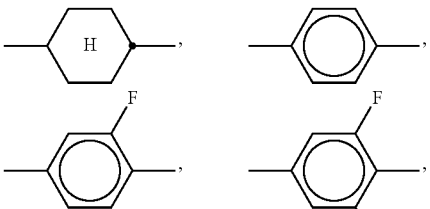

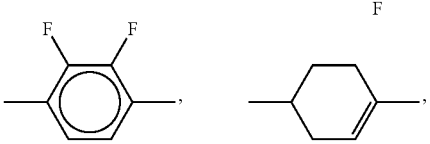

and are each, independently of one another,

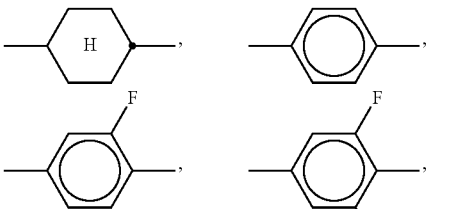

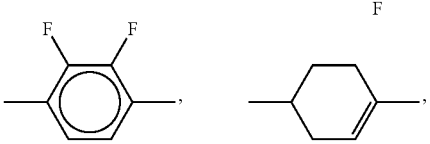

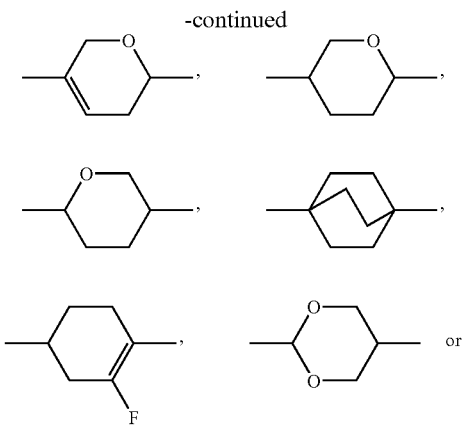

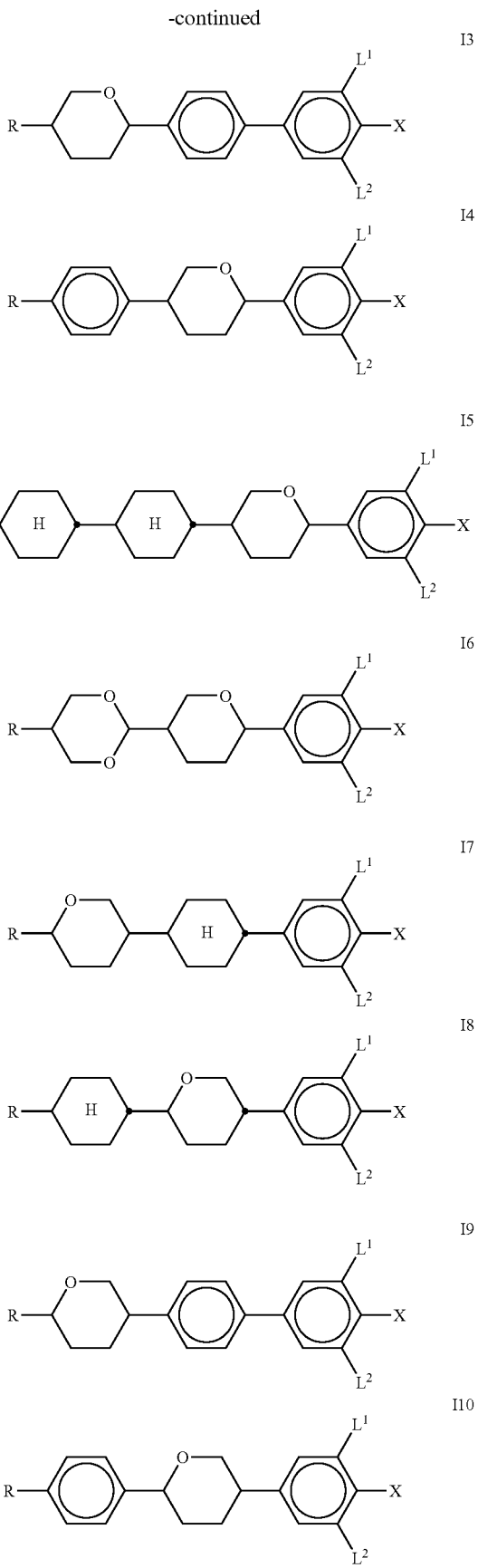

X and X¹ are each, independently of one another, F, Cl, CN, SF$_5$, NCS, a halogenated alkyl radical having 1 to 8 carbon atoms, where one or more CH$_2$ groups are optionally replaced by —O— or —CH=CH— in such a way that O atoms are not linked directly to one another, Z and Z² are each, independently of one another, —COO—, —OCO—, —CH$_2$O—, —OCH$_2$—, —CH=CF—, —CF=CH—, —CF$_2$CF$_2$—, —CF=CF—, —C≡C—, —CH$_2$CH$_2$—, —(CH$_2$)$_4$—, —CH=CH— or a single bond, L$^{1-6}$ are each, independently of one another, H or F, and m and n are each, independently of one another, 0, 1, 2 or 3, where m+n≦3.

2. A liquid-crystalline medium according to claim 1, wherein at least one of X and X¹ is: F, Cl, CN, NCS, CF$_3$, C$_2$F$_5$, C$_3$F$_7$, SF$_5$, CF$_2$H, OCF$_3$, OCF$_2$H, OCFHCF$_3$, OCFHCFH$_2$, OCFHCF$_2$H, OCF$_2$CH$_3$, OCF$_2$CFH$_2$, OCF$_2$CF$_2$H, OCF$_2$CF$_2$CF$_2$H, OCF$_2$CF$_2$CFH$_2$, OCFHCF$_2$CF$_3$, OCFHCF$_2$CF$_2$H , OCF$_2$CF$_2$CF$_3$ or OCF$_2$CHFCF$_3$.

3. A liquid-crystalline medium according to claim 1, which comprises at least one compound of formula I from the group consisting of the compounds of the formulae I1 to I14:

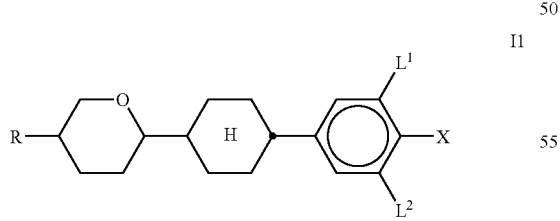

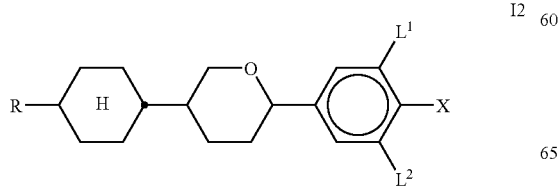

-continued
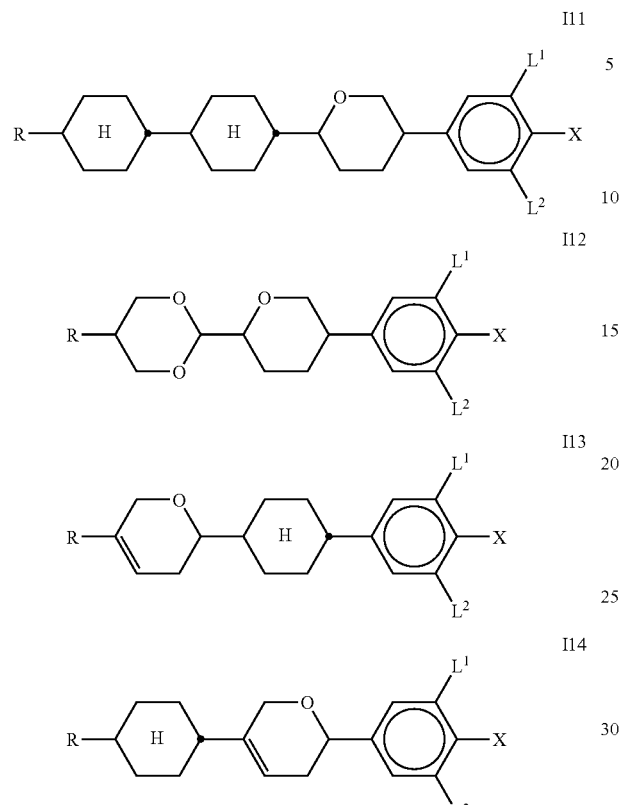
in which
R, X, $L^1$ and $L^2$ are as defined above.
4. A liquid-crystalline medium according to claim 2, which comprises at least one compound of formula I from the group consisting of the compounds of the formulae I1 to I14:
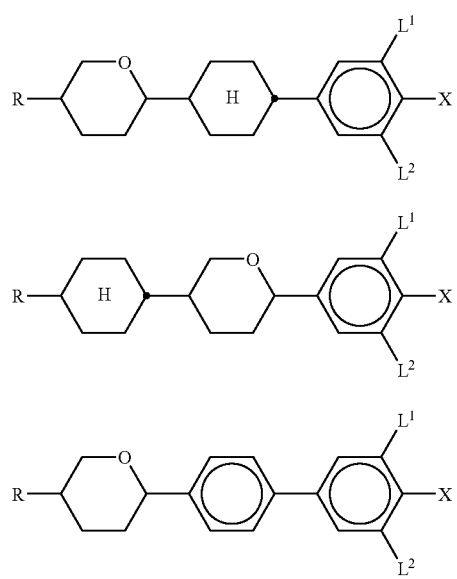
-continued
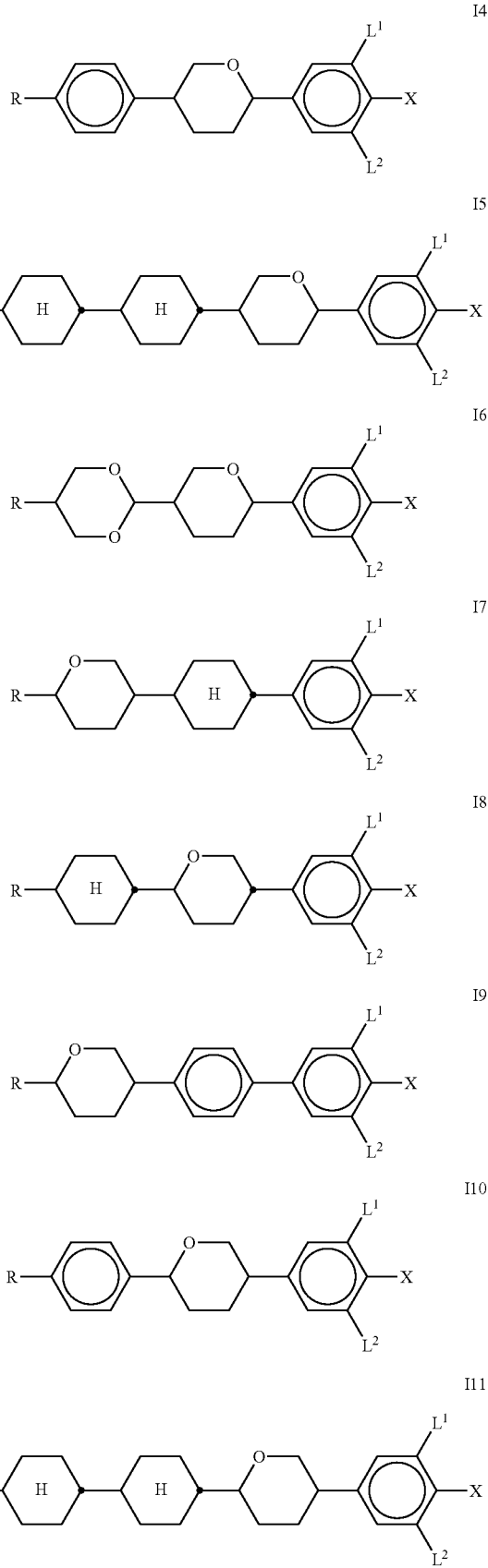

-continued

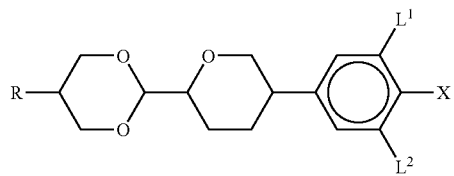
I12

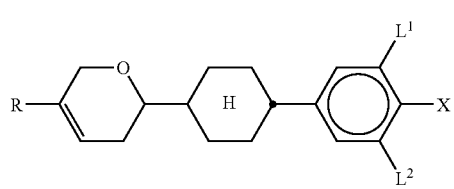
I13

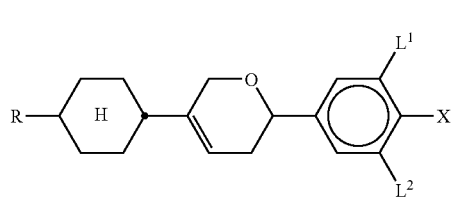
I14 in which

R, X, L¹ and L² are as defined above.

5. A liquid-crystalline medium according to claim 1, which additionally comprises one or more compounds selected from the group consisting of the compounds of formulae II, III, IV, V, VI, VII, VIII, IX, X and XI:

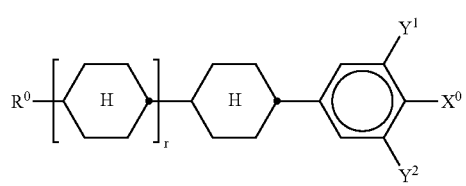
II

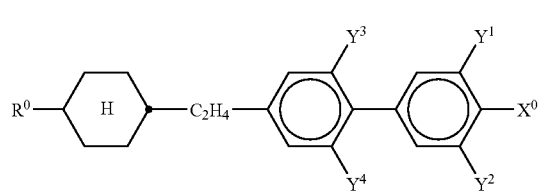
III

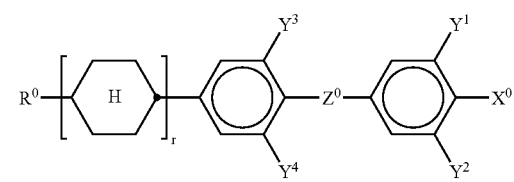
IV

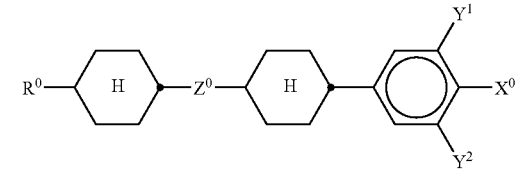
V

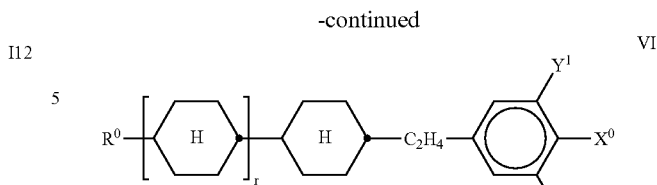
VI

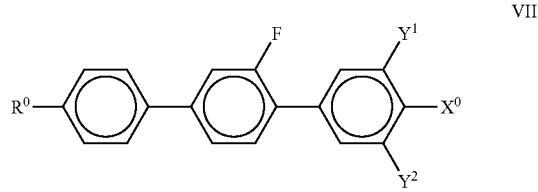
VII

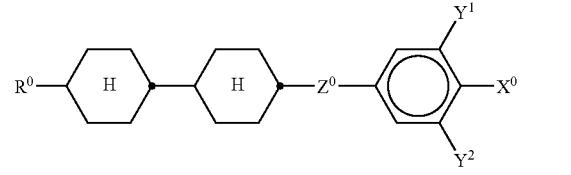
VIII

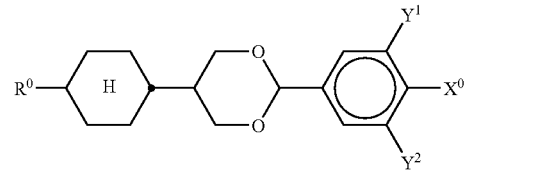
IX

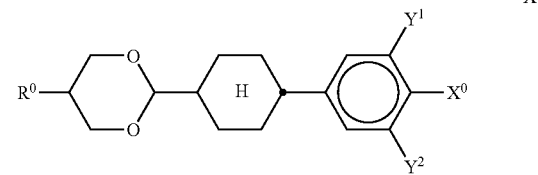
X

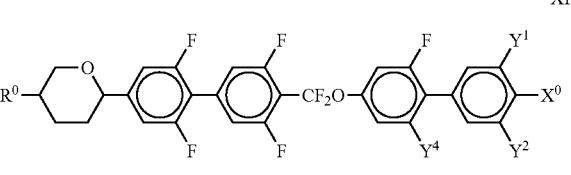
XI in which the individual radicals have the following meanings:

$R^0$ is n-alkyl, alkoxy, oxaalkyl, fluoroalkyl, alkenyloxy or alkenyl, each having from 2 to 12 carbon atoms, $X^0$ is F, Cl, halogenated alkyl, halogenated alkenyl, halogenated alkenyloxy or halogenated alkoxy, each having 1 to 8 carbon atoms, $Z^0$ is —CH=CH—, —CH$_2$O—, —OCH$_2$—, —(CH$_2$)$_4$—, —C$_2$H$_4$—, —C$_2$F$_4$—, —C≡C—, —CH=F—, —CF=CH—, —CF=CF—, —CF$_2$O—, —OCF$_2$— or —COO—, $Y^1$, $Y^2$, $Y^3$ and $Y^4$ each, independently of one another, H or F, and r 0 or 1.

6. A liquid-crystalline medium according to claim 2, which additionally comprises one or more compounds selected from the group consisting of the compounds of formulae II, III, IV, V, VI, VII, VIII, IX, X and XI:

II
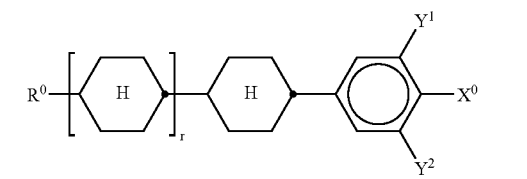

III
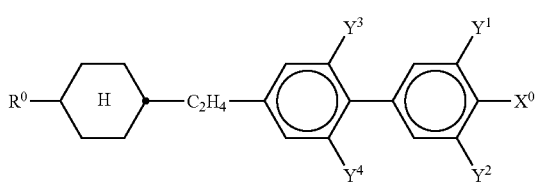

IV
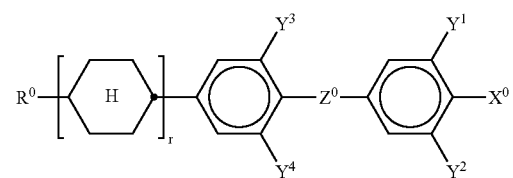

V

VI
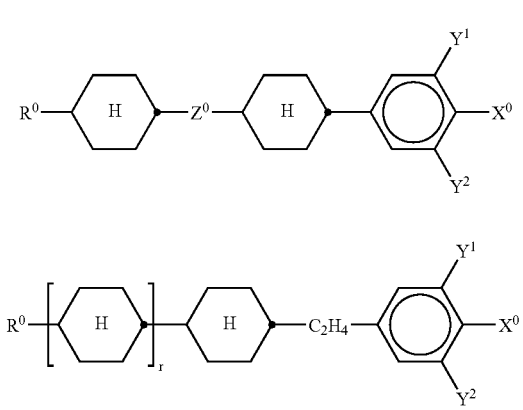

VII
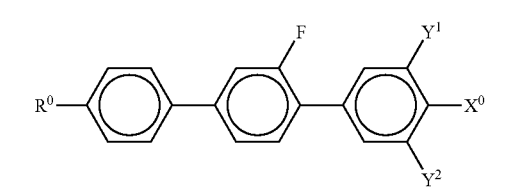

VIII
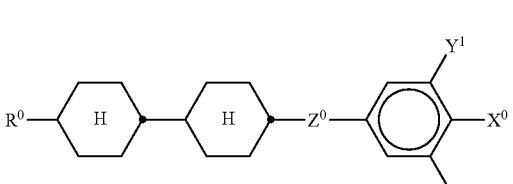

IX
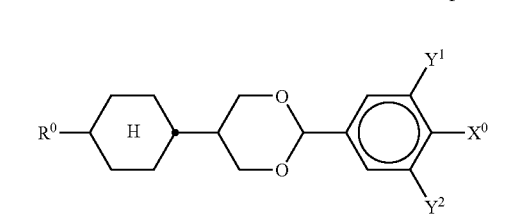

X
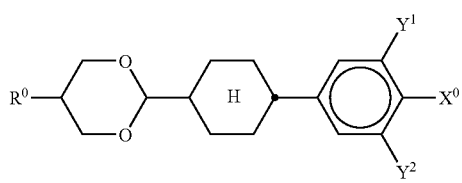

XI
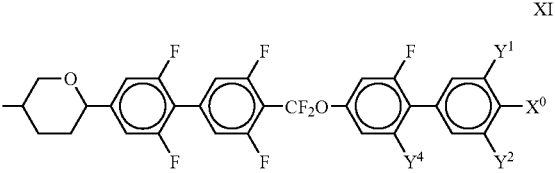

in which the individual radicals have the following meanings:

$R^0$ is n-alkyl, alkoxy, oxaalkyl, fluoroalkyl, alkenyloxy or alkenyl, each having from 2 to 12 carbon atoms, $X^0$ is F, Cl, halogenated alkyl, halogenated alkenyl, halogenated alkenyloxy or halogenated alkoxy, each having 1 to 8 carbon atoms, $Z^0$ is —CH═CH—, —CH$_2$O—, —OCH$_2$—, —(CH$_2$)$_4$—, —C$_2$H$_4$—, —C$_2$F$_4$—, —C≡C—, —CH═F—, —CF═CH—, —CF═CF—, —CF$_2$O—, —OCF$_2$— or —COO—, $Y^1$, $Y^2$, $Y^3$ and $Y^4$ each, independently of one another, H or F, and r 0 or 1.

7. A liquid-crystalline medium according to claim 3, which additionally comprises one or more compounds selected from the group consisting of the compounds of formulae II, III, IV, V, VI, VII, VIII, IX, X and XI:

II
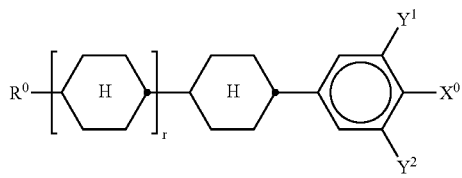

III
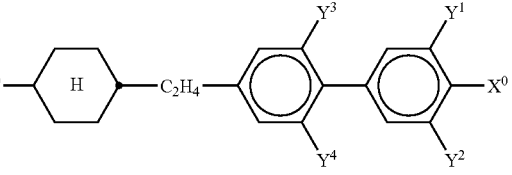

IV
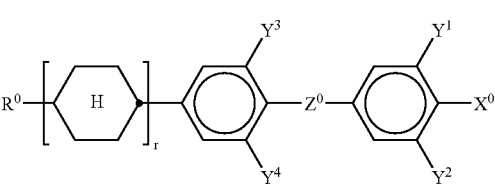

-continued

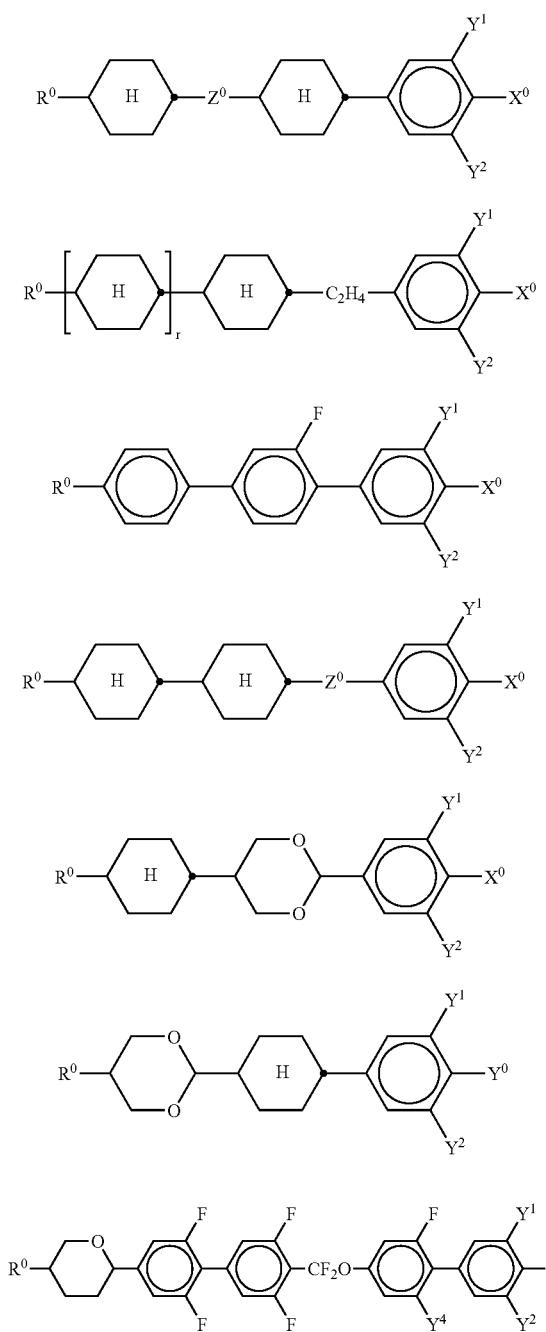

in which the individual radicals have the following meanings:

R⁰ is n-alkyl, alkoxy, oxaalkyl, fluoroalkyl, alkenyloxy or alkenyl, each having from 2 to 12 carbon atoms, X⁰ is F, Cl, halogenated alkyl, halogenated alkenyl, halogenated alkenyloxy or halogenated alkoxy, each having 1 to 8 carbon atoms, Z⁰ is —CH=CH—, —CH₂O—, —OCH₂—, —(CH₂)₄—, —C₂H₄—, —C₂F₄—, —C≡C—, —CH=F—, —CF=CH—, —CF=CF—, —CF₂O—, —OCF₂— or —COO—, $Y^1$, $Y^2$, $Y^3$ and $Y^4$ each, independently of one another, H or F, and r 0 or 1.

8. A liquid-crystalline medium according to claim 5, wherein the proportion of compounds of the formulae I to XI and C-1 to C-5 in the mixture as a whole is at least 50% by weight.

9. A liquid-crystalline medium according to claim 1, which additionally comprises one or more compounds of the formulae RI to RXVI:

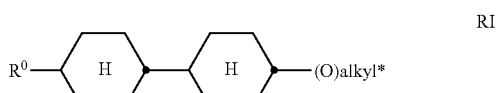

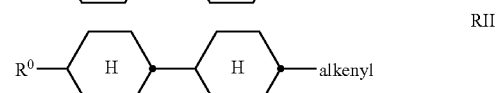

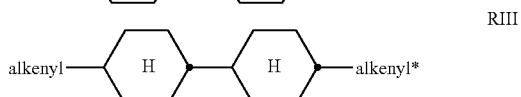

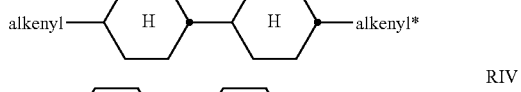

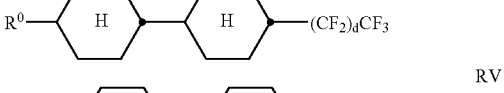

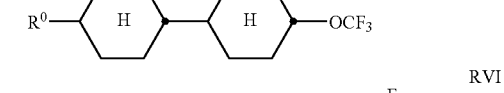

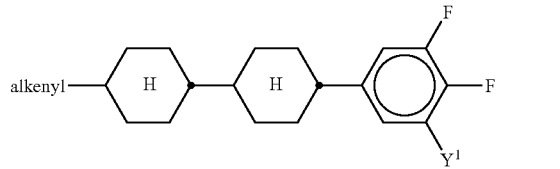

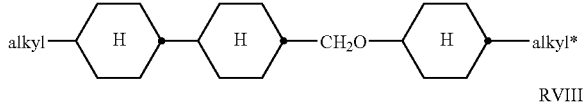

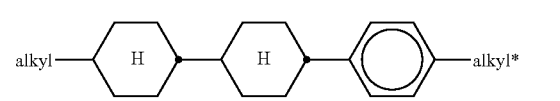

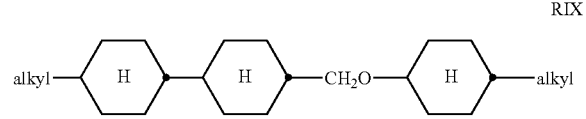

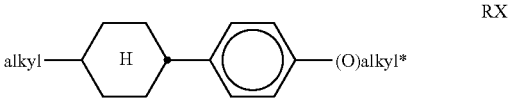

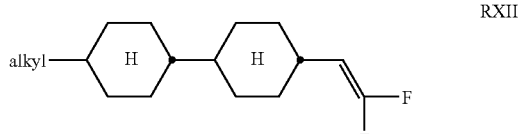

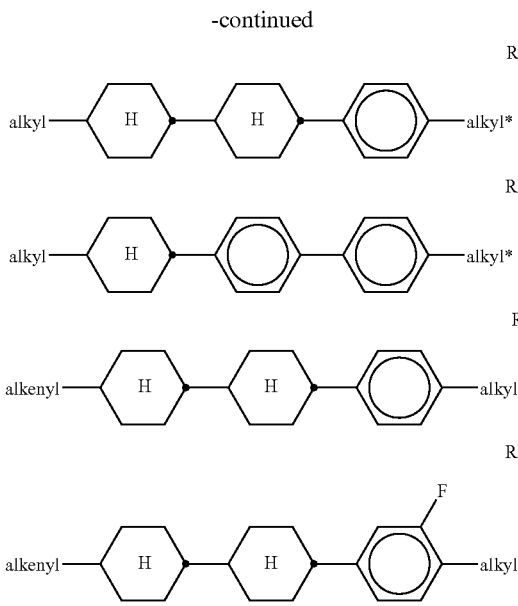

in which
- R⁰ is n-alkyl, n-alkoxy, oxaalkyl, fluoroalkyl, alkenyloxy or alkenyl, each having from 2 to 12 carbon atoms,
- d is 0, 1 or 2,
- Y¹ is H or F,
- alkyl and alkyl* are each, independently of one another, a straight-chain or branched alkyl radical having from 1 to 8 carbon atoms,
- (O)alkyl* is a straight-chain or branched alkyl or alkoxy radical having from 1 to 8 carbon atoms,
- alkenyl and alkenyl* are each, independently of one another, a straight-chain or branched alkenyl radical having from 2 to 8 carbon atoms.

10. A liquid-crystalline medium according to claim 3, which additionally comprises one or more compounds of the formulae RI to RXVI:

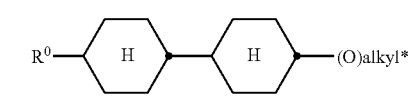

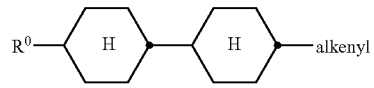

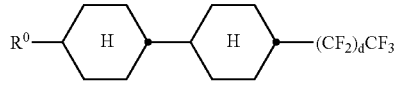

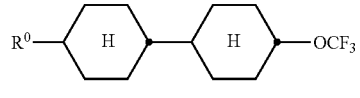

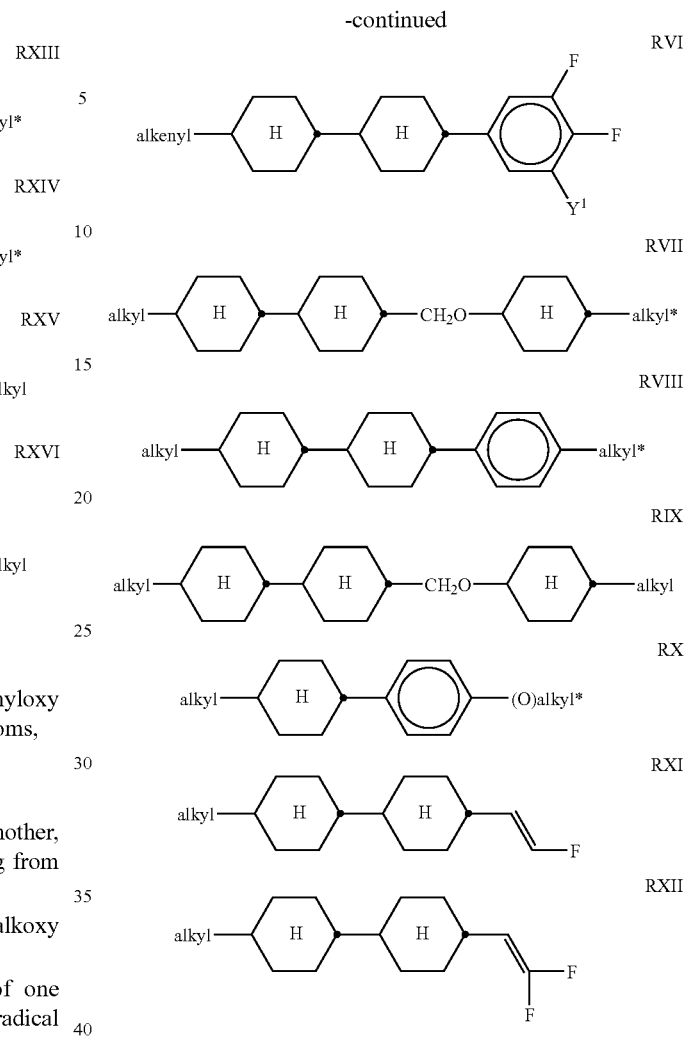

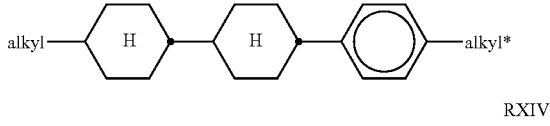

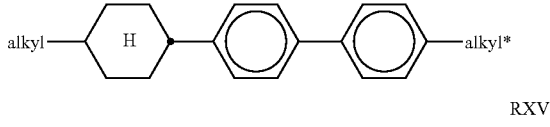

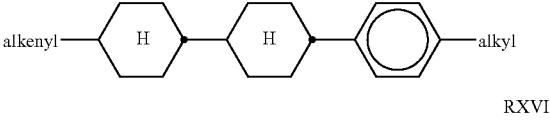

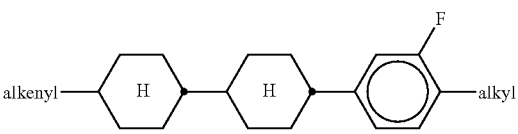

in which
- R⁰ is n-alkyl, n-alkoxy, oxaalkyl, fluoroalkyl, alkenyloxy or alkenyl, each having from 2 to 12 carbon atoms,
- d is 0, 1 or 2, Y¹ is H or F, alkyl and alkyl* are each, independently of one another, a straight-chain or branched alkyl radical having from 1 to 8 carbon atoms, (O)alkyl* is a straight-chain or branched alkyl or alkoxy radical having from 1 to 8 carbon atoms, alkenyl and alkenyl* are each, independently of one another, a straight-chain or branched alkenyl radical having from 2 to 8 carbon atoms.

11. A liquid-crystalline medium according to claim 5, which additionally comprises one or more compounds of the formulae RI to RXVI:

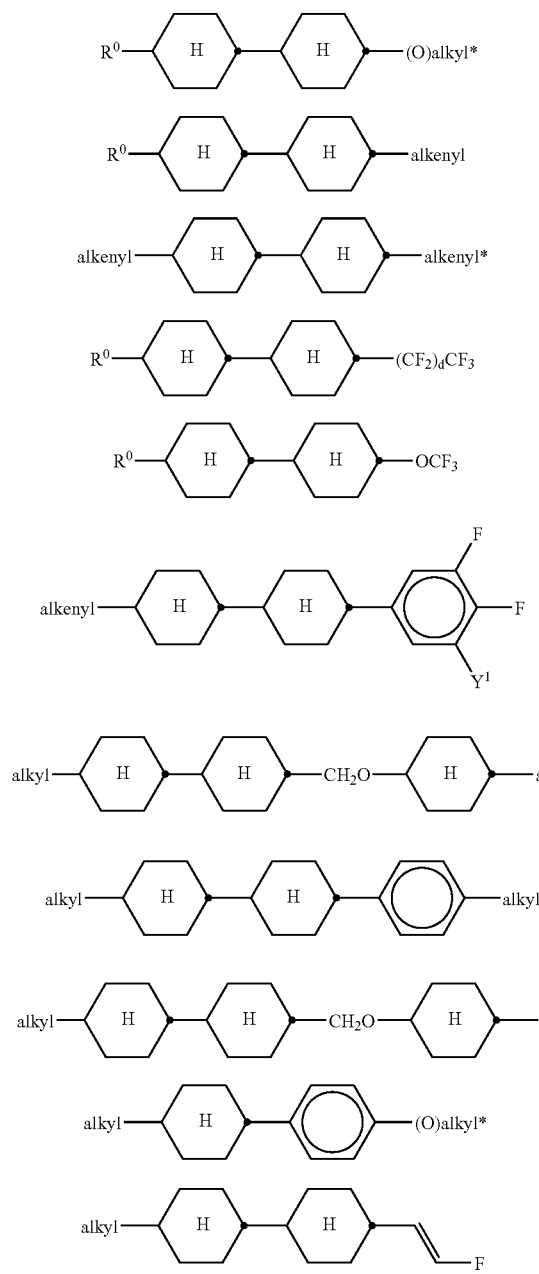
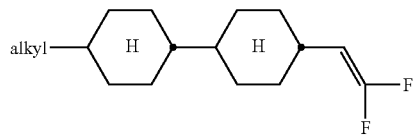
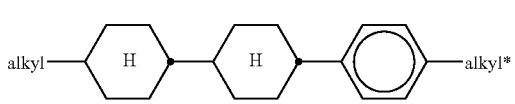
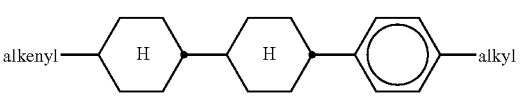
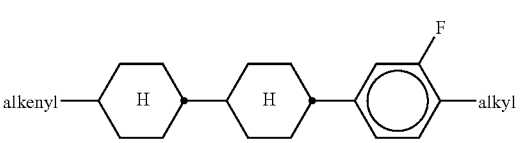

in which

R⁰ is n-alkyl, n-alkoxy, oxaalkyl, fluoroalkyl, alkenyloxy or alkenyl, each having from 2 to 12 carbon atoms, d is 0, 1 or 2, Y¹ is H or F, alkyl and alkyl* are each, independently of one another, a straight-chain or branched alkyl radical having from 1 to 8 carbon atoms, (O)alkyl* is a straight-chain or branched alkyl or alkoxy radical having from 1 to 8 carbon atoms, alkenyl and alkenyl* are each, independently of one another, a straight-chain or branched alkenyl radical having from 2 to 8 carbon atoms.

12. A liquid-crystalline medium according to claim 5, wherein X⁰ is F, Cl, OCHF₂ or OCF₃, and Y¹ and/or Y² are H or F.

13. A liquid-crystalline medium according to claim 1, wherein the proportion of compounds of the formula I in the medium is 2–50% by weight.

14. A liquid-crystalline medium according to claim 1, wherein the medium exhibits: a clearing point above 65° C.; a dielectric anisotropy value, Δ∈, of ≧6; a TN threshold below 1.5 V; and, a rotational viscosity, γ₁, at 20° C., of <200 mPa·s.

15. An electro-optical display which comprises a liquid-crystalline medium according to claim 1.

16. An electro-optical display according to claim 15, which is a TN, TFT, IPS or OCB display.

* * * * *

UNITED STATES PATENT AND TRADEMARK OFFICE
CERTIFICATE OF CORRECTION

PATENT NO. : 7,189,440 B2  
APPLICATION NO. : 11/014205  
DATED : March 13, 2007  
INVENTOR(S) : Atsutaka Manabe Page 1 of 1

It is certified that error appears in the above-identified patent and that said Letters Patent is hereby corrected as shown below:

Column 68, line 50, reads "and are each," should read -- are each, --  
Column 69, line 31, reads "Z and $Z^2$ are each," should read -- $Z^1$ and $Z^2$ are each, --  
Column 74, line 58, reads "-CH=F-," should read -- -CH=CF-, --  
Column 74, line 60, reads "$Y^3$ and $Y^4$ each," should read -- $Y^3$ and $Y^4$ are each, --  
Column 74, line 62, reads "r 0 or 1." should read -- r is 0 or 1. --  
Column 76, line 30, reads "-CH=F-," should read -- -CH=CF-, --  
Column 76, line 33, reads "$Y^3$ and $Y^4$ each," should read -- $Y^3$ and $Y^4$ are each, --  
Column 76, line 35, reads "r 0 or 1." should read -- r is 0 or 1. --  
Column 77, line 65, reads "-C=C-," should read -- -C≡C- --  
Column 77, line 66, reads "-CH=F-," should read -- -CH=CF-, --  
Column 78, line 1, reads "$Y^3$ and $Y^4$ each," should read -- $Y^3$ and $Y^4$ are each, --  
Column 78, line 3, reads "r 0 or 1." should read -- r is 0 or 1. --

Signed and Sealed this

Eleventh Day of December, 2007

JON W. DUDAS  
*Director of the United States Patent and Trademark Office*